(12) United States Patent
Kobayashi et al.

(10) Patent No.: US 12,073,841 B2
(45) Date of Patent: Aug. 27, 2024

(54) INFORMATION PROCESSING DEVICE AND INFORMATION PROCESSING METHOD

(71) Applicant: SONY GROUP CORPORATION, Tokyo (JP)

(72) Inventors: Yoshiyuki Kobayashi, Tokyo (JP); Toshiya Hamada, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 441 days.

(21) Appl. No.: 17/423,569

(22) PCT Filed: Dec. 25, 2019

(86) PCT No.: PCT/JP2019/051027
§ 371 (c)(1),
(2) Date: Jul. 16, 2021

(87) PCT Pub. No.: WO2020/153092
PCT Pub. Date: Jul. 30, 2020

(65) Prior Publication Data
US 2022/0122616 A1     Apr. 21, 2022

(30) Foreign Application Priority Data
Jan. 25, 2019   (JP) ................ 2019-011560

(51) Int. Cl.
*G10L 19/008*    (2013.01)
*H04S 7/00*      (2006.01)

(52) U.S. Cl.
CPC ............ *G10L 19/008* (2013.01); *H04S 7/301* (2013.01); *H04S 7/302* (2013.01)

(58) Field of Classification Search
CPC ....... G10L 19/008; H04S 7/301; H04S 7/304; H04S 7/302; H04S 7/303; H04S 2400/11; H04N 21/439; H04N 21/44
(Continued)

(56) References Cited

U.S. PATENT DOCUMENTS

| | | |
|---|---|---|
| 2015/0245153 A1 | 8/2015 | Malak et al. |
| 2018/0310049 A1* | 10/2018 | Takahashi ........ H04N 21/21805 |
| 2019/0174246 A1* | 6/2019 | De Bruijn ............... G06F 3/012 |

FOREIGN PATENT DOCUMENTS

| | | |
|---|---|---|
| CN | 106170992 A | 11/2016 |
| CN | 107004419 A | 8/2017 |

(Continued)

OTHER PUBLICATIONS

Object-based Audio Volume Management Patent No. 2017511048 (DTS, Inc) Document ID.*
(Continued)

*Primary Examiner* — Phung-Hoang J Nguyen
(74) *Attorney, Agent, or Firm* — CHIP LAW GROUP

(57) ABSTRACT

An audio reproduction with a realistic feeling is achieved while suppressing incongruity and discomfort given to a user. The information processing device includes an acquisition section that acquires content data including a plurality of objects, an execution timing decision section that decides an execution timing for each of the objects, a rendering processing section that renders each of the objects on the basis of line-of-sight information of a user that has been input immediately before the execution timing of rendering each of the objects, and an output synthesis section that synthesizes output data for every object that has been generated by the rendering.

13 Claims, 31 Drawing Sheets

(58) Field of Classification Search
USPC .......................................................... 700/94
See application file for complete search history.

(56) References Cited

FOREIGN PATENT DOCUMENTS

| CN | 109076306 A | 12/2018 |
| --- | --- | --- |
| EP | 3111677 A1 | 1/2017 |
| EP | 3226241 A1 | 10/2017 |
| EP | 3443762 A1 | 2/2019 |
| JP | 2017-511048 A | 4/2017 |
| JP | 2019-514293 A | 5/2019 |
| KR | 10-2016-0125511 A | 10/2016 |
| KR | 10-2017-0088843 A | 8/2017 |
| KR | 10-2018-0127508 A | 11/2018 |
| WO | 2015/131063 A1 | 9/2015 |
| WO | 2016/084592 A1 | 6/2016 |
| WO | 2017/178309 A1 | 10/2017 |
| WO | 2018/047667 A1 | 3/2018 |
| WO | WO-2018047667 A1 * | 3/2018 |
| WO | 2018/190151 A1 | 10/2018 |

OTHER PUBLICATIONS

International Search Report and Written Opinion of PCT Application No. PCT/JP2019/051027, issued on Mar. 31, 2020, 11 pages of ISRWO.

"Information technology—MPEG systems technologies—Part 8: Coding-independent code points", ISO/IEC 23001-8:2016, May 2016, 39 pages.

"Information technology—High efficiency coding and media delivery in heterogeneous environments—Part 3: 3D audio", ISO/IEC 23008-3:2015, Oct. 15, 2015, 428 pages.

* cited by examiner

*FIG. 15*

FORMAT OF INPUT DATA

| DISPLAY TIME (64 BITS) |
| --- |
| NUMBER OF OBJECTS = obj_num (8 BITS) |
| ACCESS UNIT LENGTH = N1 (32 BITS) |
| NUMBER OF RENDERING PROCESS STAGES (8 BITS) |
| ACCESS UNIT (N1 BYTES) |

*FIG. 16*

FORMAT OF INTERMEDIATE DATA

| |
|---|
| DISPLAY TIME (64 BITS) |
| NUMBER OF OBJECTS = obj_num (8 BITS) |
| AUDIO OBJECT LENGTH = N2 (32 BITS) |
| METADATA LENGTH = N3 (32 BITS) |
| OBJECT NUMBER [1] (8 BITS) |
| RENDERING ORDER [1] (8 BITS) |
| AUDIO OBJECT [1]<br>(N2 BYTES) |
| METADATA [1]<br>(N3 BYTES) |
| ⋮ |
| OBJECT NUMBER [obj_num] (8 BITS) |
| RENDERING ORDER [obj_num] (8 BITS) |
| AUDIO OBJECT [obj_num]<br>(N2 BYTES) |
| METADATA [obj_num]<br>(N3 BYTES) |

*FIG. 17*

FORMAT OF OUTPUT DATA

| DISPLAY TIME (64 BITS) |
| --- |
| NUMBER OF OUTPUT DESTINATIONS = num_output (8 BITS) |
| OUTPUT AUDIO DATA LENGTH = N4 (32 BITS) |
| OUTPUT AUDIO DATA [1] (N4 BYTES) |
| ⋮ |
| OUTPUT AUDIO DATA [num_output] (N4 BYTES) |

FIG. 24A
| NUMBER OF OBJECTS = 6 |
| OBJECT NUMBER [1] = 1 |
| OBJECT NUMBER [2] = 2 |
| OBJECT NUMBER [3] = 3 |
| OBJECT NUMBER [4] = 4 |
| OBJECT NUMBER [5] = 5 |
| OBJECT NUMBER [6] = 6 |
FIG. 24B
| NUMBER OF OBJECTS = 6 |
| OBJECT NUMBER [1] = −1 |
| OBJECT NUMBER [2] = 2 |
| OBJECT NUMBER [3] = −1 |
| OBJECT NUMBER [4] = 4 |
| OBJECT NUMBER [5] = −1 |
| OBJECT NUMBER [6] = 6 |
FIG. 24C
| NUMBER OF OBJECTS = 3 |
| OBJECT NUMBER [1] = 2 |
| OBJECT NUMBER [2] = 4 |
| OBJECT NUMBER [3] = 6 |

FIG. 27

| METADATA FIELD |
| --- |
| AZIMUTH (16 BITS) |
| ELEVATION (8 BITS) |
| RADIUS (32 BITS) |
| GAIN (32 BITS) |
| SPREAD (32 BITS) |
| RENDERING ORDER (8 BITS) |

…

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/051027 filed on Dec. 25, 2019, which claims priority benefit of Japanese Patent Application No. JP 2019-011560 filed in the Japan Patent Office on Jan. 25, 2019. Each of the above-referenced applications is hereby incorporated herein by reference in its entirety.

TECHNICAL FIELD

The present disclosure relates to an information processing device and an information processing method.

BACKGROUND ART

In audio reproduction, conventionally, a panning technique for reflecting line-of-sight information of a user to change sound image localization is known. On the other hand, a buffering technique for delaying an audio output for time synchronization between an image and audio has also been established.

CITATION LIST

Non-Patent Document

Non-Patent Document 1: INTERNATIONAL STANDARD ISO/IEC 23008-3 First edition 2015-10-15 Information technology—High efficiency coding and media delivery in heterogeneous environments—Part 3: 3D audio Non-Patent Document 2: INTERNATIONAL STANDARD ISO/IEC 23001-8 Information technology—MPEG systems technologies—Part 8: Coding-independent code points

SUMMARY OF THE INVENTION

Problems to be Solved by the Invention

In a case where the panning technique and the buffering technique are combined together, however, buffering of an audio output causes a delay in following the line-of-sight of the user, that is, a deviation in image-audio synchronization.

Accordingly, there exists a drawback that may give the user a sense of incongruity. In addition, in a case where the audio output is not buffered, the panning process is concentrated and the load is temporarily increased.

Accordingly, there exists a drawback that a defect such as audio skipping or audio cracking may occur, and may give the user a sense of discomfort.

Therefore, the present disclosure proposes an information processing device and an information processing method, which are capable of achieving an audio reproduction with a realistic feeling, while suppressing incongruity, discomfort, and the like given to the user.

Solutions to Problems

In order to solve the above problems, an information processing device according to one aspect of the present disclosure includes: an acquisition section configured to acquire content data including a plurality of objects; an execution timing decision section configured to decide an execution timing of rendering each of the objects; a rendering processing section configured to render each of the objects on the basis of line-of-sight information of a user that has been input immediately before the execution timing of rendering each of the objects; and an output synthesis section configured to synthesize output data for every object that has been generated by the rendering.

BRIEF DESCRIPTION OF DRAWINGS

FIG. 15 is a diagram showing an example of a data format of input data according to the first embodiment.

FIG. 16 is a diagram showing an example of a data format of intermediate data according to the first embodiment.

FIG. 17 is a diagram showing an example of a data format of output data according to the first embodiment.

FIGS. 24A, 24B, and 24C are diagrams showing a specific example for describing a compression process of the intermediate data storage section according to the first embodiment.

FIG. 27 is a diagram showing an example of a metadata field in a case where the rendering order is decided on a content generation side according to the first embodiment.

MODE FOR CARRYING OUT THE INVENTION

Figure 1:
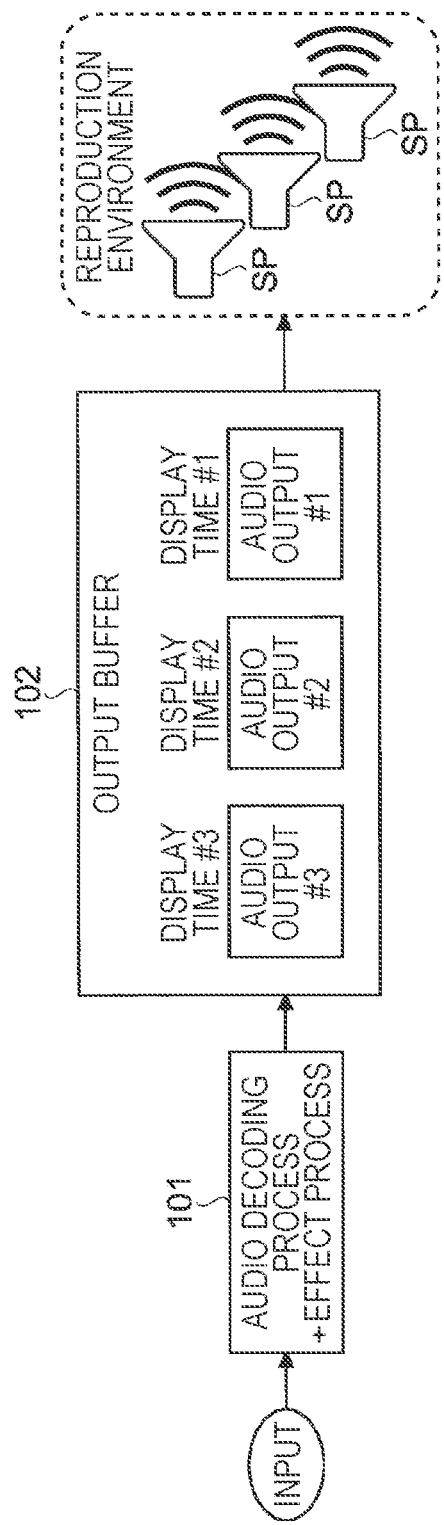
FIG. 1 is a diagram for describing a flow of a general audio reproduction using a buffering technique.

Hereinafter, embodiments of the present disclosure will be described in detail with reference to the drawings. It is to be noted that in the following embodiments, the same parts are designated by the same reference numerals, so that duplicate description will be omitted.

In addition, the present disclosure will be described according to the order of items shown below.
1. Introduction
  1.1 Technology for time synchronization in image and audio reproduction in image and audio reproduction device
    1.1.1 Setting of fixed delay amount
    1.1.2 Buffering of audio output
  1.2 Panning technique for a plurality of audio sources to change sound image localization
  1.3 Problem generated by combining buffering technique and panning technique
  1.4 About audio data encoding method
    1.4.1 MPEG-H 3D Audio encoding method
  1.5 About terminology
2. First Embodiment
  2.1 Example of MPEG-H 3D Audio rendering
  2.2 System configuration
  2.3 Data formats of input data, intermediate data, and output data
  2.4 About data structure in intermediate data storage section
  2.5 Operation flow
    2.5.1 MPEG-H 3D Audio bitstream reproduction flow
    2.5.2 Decoding process (step S104)
    2.5.3 N-th order rendering process (step S106)
    2.5.4 Rendering process of I-th audio object (step S144)
    2.5.4.1 Output synthesis process (step S166)
    2.5.4.2 Compression process of intermediate data storage section (step S167)
    2.5.5 Rendering process stage number decision process (step S102)
    2.5.6 Rendering order decision process (step S124)
  2.6 Decision of rendering order on content generation side
3. Second Embodiment
  3.1 System configuration
4. Hardware configuration
5. Conclusion 1. Introduction In describing an information processing device and an information processing method according to embodiments of the present disclosure, first, the technology to be a precondition on each embodiment will be described with reference to the drawings.

1.1 Technology for Time Synchronization in Image and Audio Reproduction in Image and Audio Reproduction Device Generally, the time synchronization in image and audio reproduction is called lip sync, and is achieved by delaying an audio output until a video output preparation is completed. This is because the incongruity felt by a user in a case where audio advances with respect to a video is greater than the incongruity felt by the user in a case where the audio delays with respect to the video. In other words, the user sensitivity to a voice advance is higher than the user sensitivity to a voice delay, and the case where the voice advance gives the user a greater sense of incongruity.

1.1.1 Setting of Fixed Delay Amount

On a general digital television, in order to eliminate a deviation in the image-audio synchronization, a function of setting by a user an audio delay amount of a fixed value is provided. In addition, high-definition multimedia interface (HDMI) provides a setting function of a fixed delay amount, as a countermeasure against a transmission delay, or the like. All of these functions are intended to eliminate the deviation in the image-audio synchronization under the user environment.

1.1.2 Buffering of Audio Output

As described above, there is a technique for avoiding a deviation in the image-audio synchronization by buffering an audio output. In this technique, the audio output is buffered for the purpose of delaying the audio output.

FIG. 1 is a diagram for describing a general flow of an audio reproduction using a buffering technique. As shown in FIG. 1, in an audio reproducing function implemented as an application on an information processing device such as a personal computer (PC) (hereinafter, also referred to as a PC application), or in an audio reproducing function on a device in which a general-purpose operating system (OS) such as Linux is mounted, an audio decoding process and an effect process (101) are performed on audio data that has been input.

Accordingly, the audio data for every display time (hereinafter, also referred to as audio output) is generated. In the example shown in FIG. 1, for example, audio outputs #1 to #3 are generated for the respective display times #1 to #3 with respect to the input audio data. It is to be noted that "#n (n is a natural number)" in the present description may correspond to, for example, an order on a time axis.

In the general flow of audio reproduction, some type of effect process is performed on the audio data that has been subjected to an audio decoding process. Examples of the effect process include, for example, processes intended to improve audio quality by using a high-pass filter, a low-pass filter, or the like. However, such an effect process is not essential, and may be omitted.

The buffering in the audio output does not mean outputting of the audio data directly to a speaker or the like after the audio decoding process or the effect process is performed.

The audio data is temporarily accumulated in an output buffer, and at a timing when a display time given to the audio data coincides with a time in a reproduction system, the audio data that is being buffered is output to the speaker or the like. It is to be noted that the reproduction system may be a system that conducts an audio output or a video output, and the time may be a time on the time axis managed by the system in the audio reproduction or the video reproduction.

Therefore, in the example shown in FIG. 1, the audio outputs #1 to #3 generated by the audio decoding process and the effect process (101) for the respective display times #1 to #3 are temporarily accumulated in an output buffer 102, and are then input into one or more speakers SP that constitute a reproduction environment, when timings of the respective display times #1 to #3 have come.

In a similar manner, the video is output to the monitor or the like at a timing when the display time given to the video data coincides with the time of the reproduction system. In this manner, by synchronizing the video display time and the audio display time with the time in the reproduction system used as a reference, the image-audio synchronization is enabled.

1.2 Panning Technique for a Plurality of Audio Sources to Change Sound Image Localization Further, as described above, in the audio reproduction, there is a known technique for performing a panning process on multi-channel audio for outputting, in order to change the sound image localization. The panning process is a technique for changing sound localization on each channel. By using the panning technique, for example, the line-of-sight information of a user is received, and the localization of the multi-channel sound is changed in accordance with the line-of-sight, so that an effect as if the audio output were following the line-of-sight of the user can be provided.

1.3 Problem Generated by Combining Buffering Technique and Panning Technique

The method of setting the audio delay of a fixed value that has been described above in "1.1.1 Setting of fixed delay amount" in "1.1 Technology for time synchronization in image and audio reproduction in image and audio reproduction device" is effective for eliminating delays in transmission lines of digital television broadcasting, the HDMI, and the like.

However, in cases where there are variations in a sampling rate of a bitstream to be input, the total number of channels, and the like, there exists a drawback that such an audio delay amount of a fixed value is not capable of supporting the variations.

Figure 2:
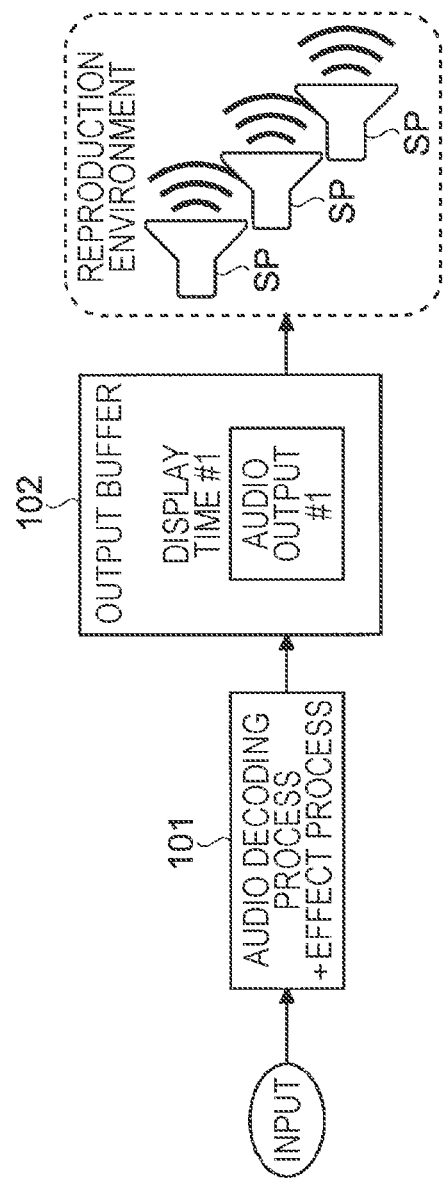
FIG. 2 is a diagram for describing a flow of an audio reproduction in a case where a buffer size is reduced.

In addition, in a case of using the buffering technique that has been described in "1.1.2 Buffering in audio output" in "1.1 Technology for time synchronization in image and audio reproduction in image and audio reproduction device", the stability in the audio reproduction (without the audio skipping or the audio cracking) and the accuracy in the image-audio synchronization have a trade-off relationship. That is, for example, as shown in FIG. 2, in a case where the buffer size of the output buffer 102 is reduced, the period for attempting the image-audio synchronization can be shortened.

Therefore, the accuracy in the image-audio synchronization is improved, but a high real-time performance is demanded for the process, and a risk of the audio skipping, a mixed noise, or the like increases.

Figure 3:
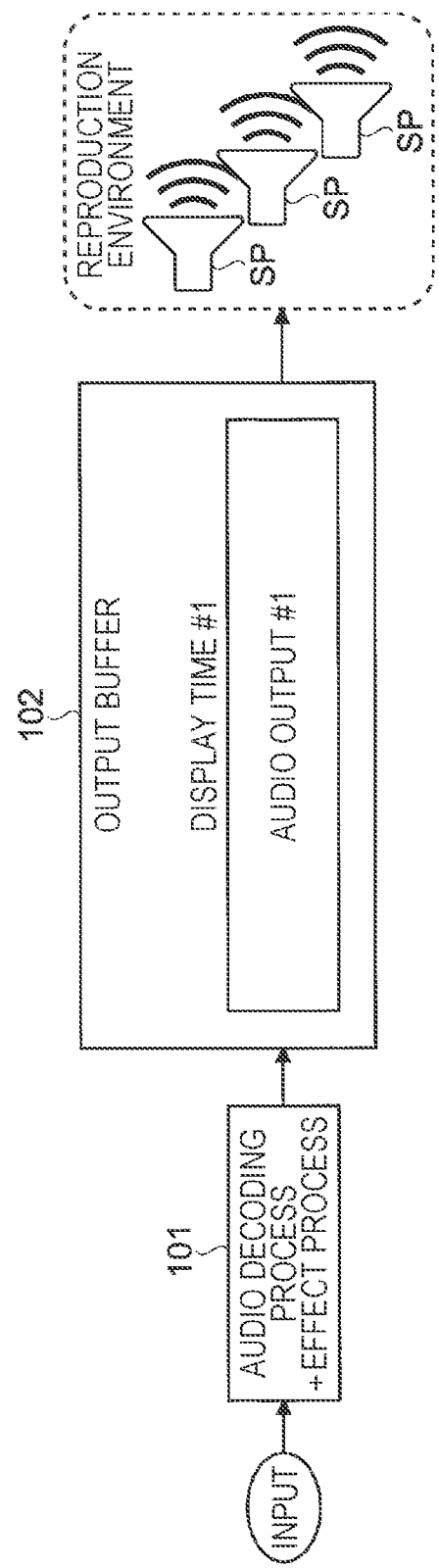
FIG. 3 is a diagram for describing a flow of an audio reproduction in a case where the buffer size is increased.

On the other hand, as shown in FIG. 3, in a case where the buffer size of the output buffer 102 is increased, the risk of the audio skipping and the audio cracking is reduced.

Therefore, the stable reproduction is possible, but the accuracy in the image-audio synchronization is reduced, and a deviation in the synchronization may occur. In addition, inevitably, a large buffer size is demanded for the output buffer 102. It is to be noted that FIG. 2 is a diagram for describing the flow of the audio reproduction in a case where the buffer size is reduced, and FIG. 3 is a diagram for describing the flow of the audio reproduction in a case where the buffer size is increased.

Figure 4:
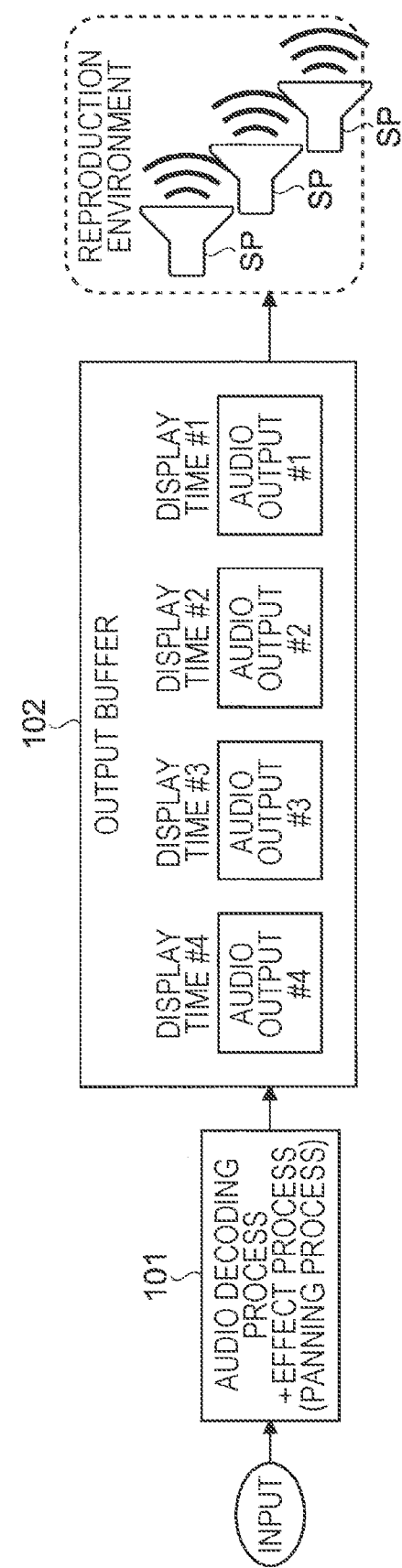
FIG. 4 is a diagram for describing a flow of an audio reproduction in a case where a buffering technique and a panning technique are combined together (part one).
Figure 5:
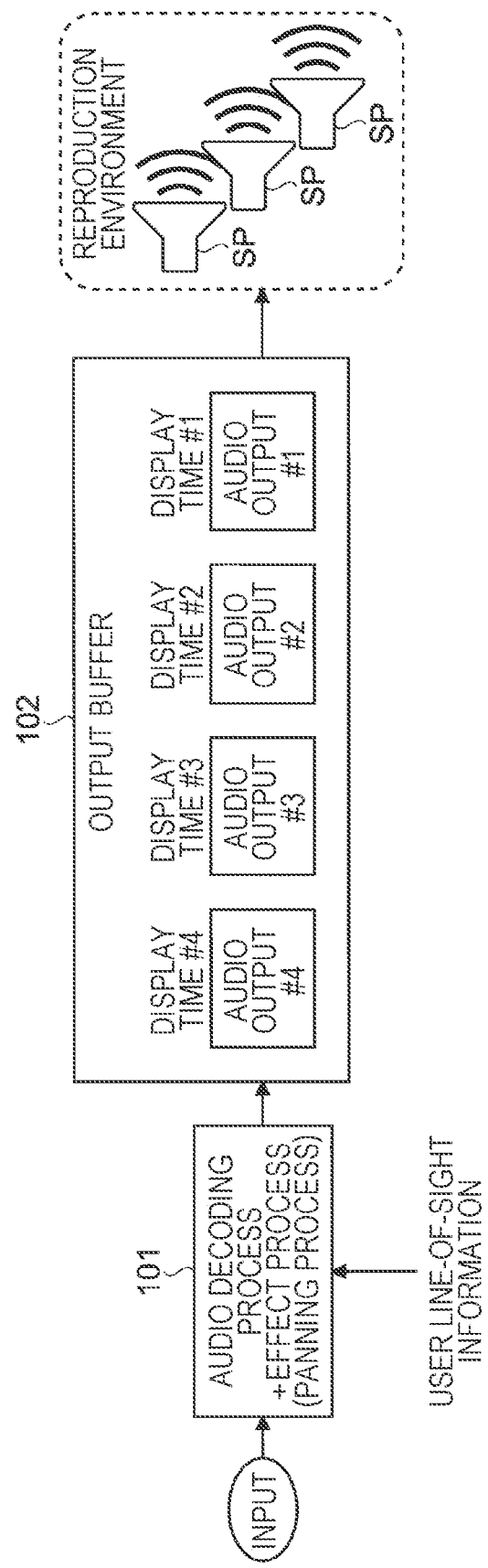
FIG. 5 is a diagram for describing a flow of the audio reproduction in a case where the buffering technique and the panning technique are combined (part two).
Figure 6:
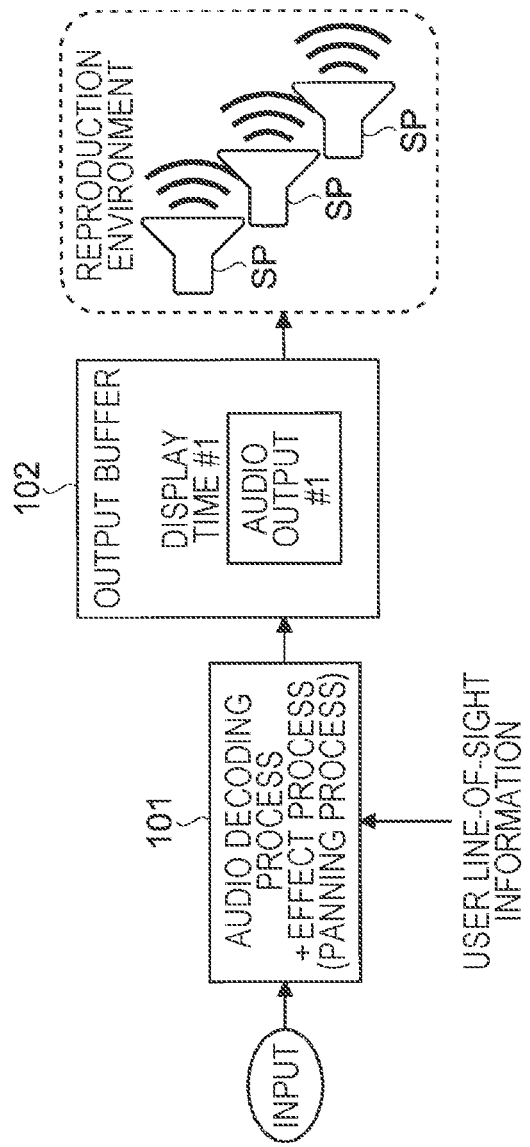
FIG. 6 is a diagram for describing a flow of the audio reproduction in a case where the buffering technique and the panning technique are combined (part three).

Next, a description will be given with regard to a case where the panning technique that has been described in "1.2 panning technique for a plurality of audio sources to change sound image localization" is combined with an image and audio reproduction system using such a buffering technique. FIGS. 4 to 6 are diagrams for describing flows of the audio reproduction in a case where the buffering technique and the panning technique are combined together.

As shown in FIG. 4, in the image and audio reproduction system in which the buffering technique and the panning technique are combined together, a panning process is performed in the effect process (101).

In such a panning process, information for changing the sound image localization is necessary.

For example, as shown in FIG. 5, in a case where the line-of-sight information of the user (hereinafter, referred to as user line-of-sight information) is used as the information for changing the sound image localization, the following drawbacks may occur. It is to be noted that the user line-of-sight information may be information regarding the line-of-sight direction of the user with respect to a screen, for example, in a case where the reproduction system includes the screen for displaying an image such as a television or a head-mounted display, or may be information regarding an orientation of the user's face with respect to the speaker or a reference direction (also referred to as line-of-sight information), in a case where the reproduction system does not include a screen, such as a speaker or a headphone.

That is, in the case where the panning process is included in the effect process, the localization is calculated on the basis of the user line-of-sight information at the time of the panning process.

Hence, in a case where the time for performing the panning process and the display time of the audio output based on a time stamp are largely deviated from each other, the line-of-sight direction of the user indicated by the user line-of-sight information used in the panning process and the line-of-sight direction of the user in reality when the audio output is made from the reproduction environment are largely deviated. As a result, such a deviation is directly recognized by the user as a delay in following the line-of-sight direction of the user, and may cause a deviation in a spatial location between the image and the audio.

For example, as an example shown in FIG. 5, in a case where the reproduction system is set to buffer four audio outputs #1 to #4, the panning process is performed on the basis of the user line-of-sight information at the time when the audio output #1 at the display time #1 is output, in the effect process (101).

As a result, the audio outputs #1 to #4 at the display times #1 to #4 are respectively generated.

In such a case, in the reproduction of the audio outputs #2 to #4 at the display times #2 to #4, which are shifted in time from the display time #1, an impression that the line-of-sight direction is poorly followed may be given to the user.

As a result, the user's interest and expectation feeling may be greatly impaired.

Generally, a "lip sync deviation" means that there is a temporal gap between the movement of an audio source such as a mouth and sounds emitted from such an audio source.

However, in a broad sense, a deviation in the spatial location between a location of the audio source on a video and a location of the audio source expressed by the audio can also be included in the definition of "lip sync deviation". Therefore, in the present description, such a deviation in the spatial location is also referred to as a "lip sync deviation".

In order to make a user line-of-sight direction at the time of the panning process and the user line-of-sight direction at the time of an output coincide with each other as much as possible, for example, as shown in FIG. 6, the audio output #1 that has been generated by the panning process (101) is sequentially input into a reproduction environment, and the audio is output.

In other words, the data flow from the panning process (101) to the audio output has to be directly connected.

However, in such a case, the audio decoding process, the effect process, the panning process, and the like each having a high process load are performed in a concentrated manner immediately before the audio output. For such a reason, for example, in the case of the audio reproduction, a risk of degradation in audio quality such as the audio skipping and the audio cracking may increase.

Therefore, in the following embodiments, even in a case where the panning technique and the buffering technique are combined together, an information processing device and an information processing method which are capable of achieving audio reproduction with a realistic feeling, by suppressing defects such as a deviation in the image-audio synchronization, the audio skipping, the audio cracking, and the like, while suppressing the incongruity or discomfort given to a user.

1.4 about Audio Data Encoding Method 1.4.1 MPEG-H 3D Audio Encoding Method

It is to be noted that in the following embodiments, a case where the MPEG-H 3D Audio encoding method is adopted as an audio data encoding method will be given as an example. In MPEG-H 3D Audio encoding method, in addition to a conventional two channel stereo method and a multi-channel method such as 5.1 channel, an audio source that is moving, or the like is treated as an independent audio object, and location information of the audio object (the audio source) together with signal data of the audio object can be encoded as metadata.

By transmitting the audio object and the metadata separately in this manner, it becomes easy to process a specific audio source at the time of reproduction, which is difficult in the conventional encoding method.

The audio object is rendered on the basis of the metadata associated with this, and is mapped to each speaker that constitutes the reproduction environment.

Accordingly, the audio output that has been generated is input into each speaker, and is then reproduced.

It is to be noted that in the MPEG-H 3D Audio standard, the process of mapping each audio object to the speaker in the reproduction environment is called rendering, but the process content may be similar to three-dimensional panning.

Figure 7:
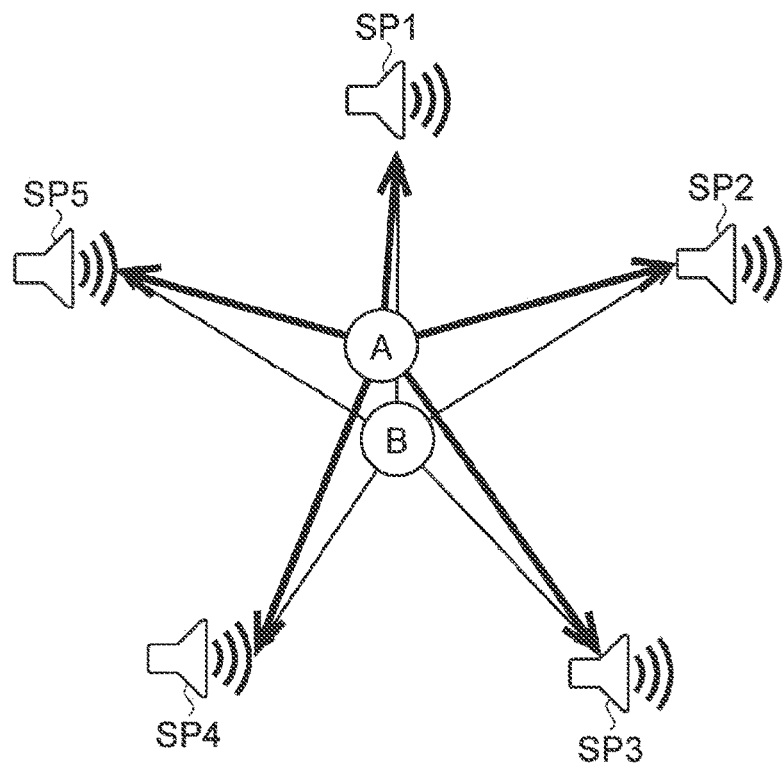
FIG. 7 is a diagram for describing an example of mapping and outputting two audio objects to five speakers constituting a reproduction environment.

FIG. 7 is a diagram for describing an example in which two audio objects A and B are mapped and are output to five speakers SP1 to SP5 constituting a reproduction environment. In the example shown in FIG. 7, a total of ten types of mapping are performed, that is, a process of mapping the audio object A to the five speakers SP1 to SP5 and a process of mapping the audio object B to the five speakers SP1 to SP5. Specifically, they are as follows.

1. Output of the audio object A to the speaker SP1
2. Output of the audio object A to the speaker SP2
3. Output of the audio object A to the speaker SP3
4. Output of the audio object A to the speaker SP4
5. Output of the audio object A to the speaker SP5
6. Output of the audio object B to the speaker SP1
7. Output of the audio object B to the speaker SP2
8. Output of the audio object B to the speaker SP3
9. Output of the audio object B to the speaker SP4
10. Output of the audio object B to the speaker SP5

However, the technology according to the present disclosure is not limited to the MPEG-H 3D Audio encoding method, and various encoding methods capable of changing the sound image localization can be adopted.

1.5 about Terminology

Here, terms used in the present disclosure will be described.

(Access Unit)

An "access unit" in the present disclosure refers to, for example, a data structure including an audio object and metadata of the same display time.

There may be a plurality of audio objects and a plurality of pieces of metadata. In addition, the audio object and the metadata are paired by an object number.

(Audio Object)

An "audio object" in the present disclosure is defined as, for example, object, the component objects, and the like in ISO/IEC 14496-3, and refers to a material sound that is a component element for generating a sound field. For example, in a case where the audio object is music, the sound of each musical instrument such as a guitar sound or a drum sound can be treated as a single audio object. However, without limiting to this, the sound of a plurality of musical instruments can be treated as a single audio object. That is, what is specifically treated as an audio object may be decided by a content creator appropriately.

(Metadata)

Figure 8:
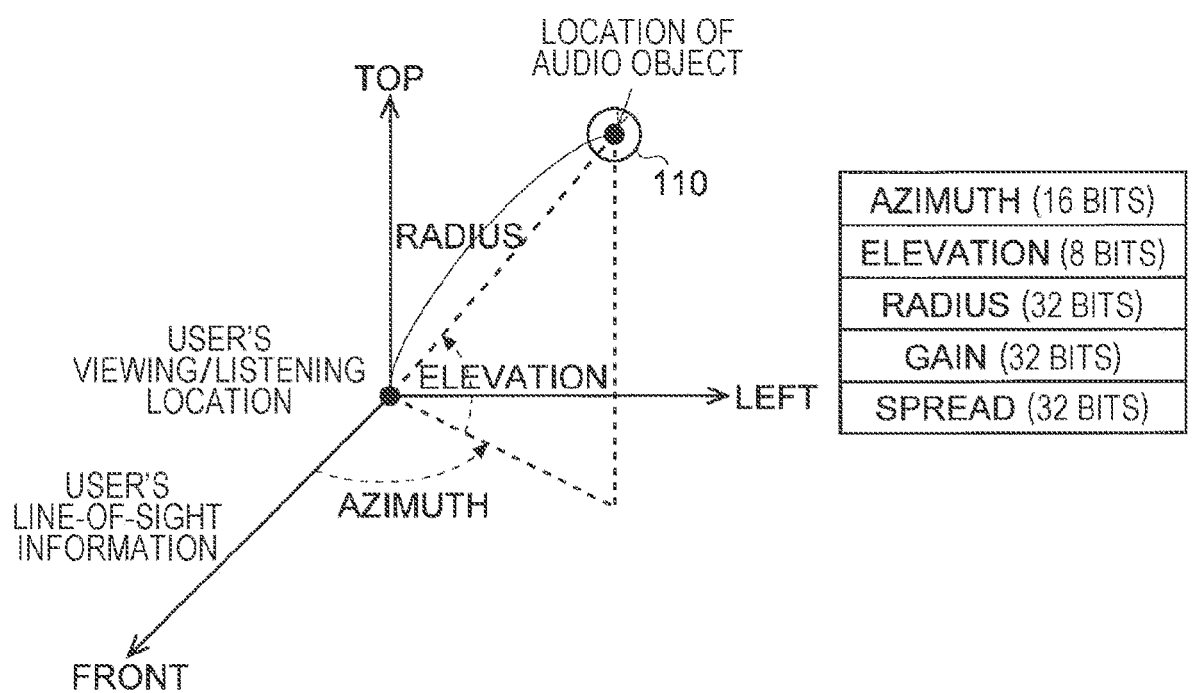
FIG. 8 is a diagram for describing location information included in metadata.

"Metadata" in the present disclosure may include, for example, the location information of each audio object based on a viewing/listening location of a user in a three-dimensional (virtual) space where the content is reproduced. Such location information can be represented by three parameters that are azimuth, elevation, and radius, for example, as shown in FIG. 8. The azimuth may represent an azimuth angle in a spherical coordinate system, the elevation may represent an elevation angle in the spherical coordinate system, and the radius may represent a radius in the spherical coordinate system.

In addition to the location information, the metadata may include a parameter such as a gain or a spread.

For example, the gain may represent a linear gain value of an audio object to be localized at the location of the audio object 110 specified by the location information. The linear gain value of the audio object can correspond to, for example, a volume ratio when the spread of the audio object 110 in FIG. 8 is expanded or contracted.

For example, the spread represents the degree of a spatial spread, and the spread degree is indicated by a value between 0 degrees and 180 degrees. In a case where the spread value is 0 or more, the location of the audio object 110 shown in polar coordinates is rendered so as to be spread and distributed by the direction corresponding to a spread value.

2. First Embodiment

Next, an information processing device and an information processing method according to a first embodiment of the present disclosure will be described in detail with reference to the drawings.

In the present embodiment, a deviation in the spatial location between the image and the audio is reduced by adaptively deciding an opportunity (a timing) of a panning process in the unit of audio sources (an audio channel or an audio object). Therefore, in the present embodiment, an opportunity for the panning process is adaptively decided for every audio source of a plurality of audio sources, and the panning process is performed for every audio source at the opportunity that has been determined.

The term "adaptive" in the present description is described by taking a video content of a music live show as an example.

For example, even in a case of a vocalist of a music live show, high accuracy of the image-audio synchronization is demanded in a close-up video (for example, a video of reproducing the vocalist in close-up), whereas the high accuracy of the image-audio synchronization is not demanded in a long-shot video (for example, a video of reproducing the entire live venue from a distant place from the vocalist), because it is difficult to grasp detailed behaviors of the vocalist, the vocalist's voices are heard only by outputs from a main speaker of the live venue, and the like. Therefore, as the audio source is farther from the viewing/listening location of a user on the basis of the location information of the audio source, the time difference between a timing (an opportunity) of the panning process and a timing (a display time) of the audio output can be increased.

For example, it can be determined that the opportunity of the panning process can be advanced with respect to the audio output.

Therefore, in the present embodiment, by varying the opportunity of the panning process according to an accuracy demanded for image-audio synchronization, an occurrence of a deviation in the spatial location synchronization between the image and the audio is controlled. This configuration enables suppression of a deviation in the image-audio synchronization caused by increasing a buffer size.

Further, in the present embodiment, distribution of the process loads is aimed for by adaptively performing the panning process for every audio source. This configuration enables suppression of the audio skipping, the audio cracking, and the like that may occur by reducing the buffer size.

Figure 9:
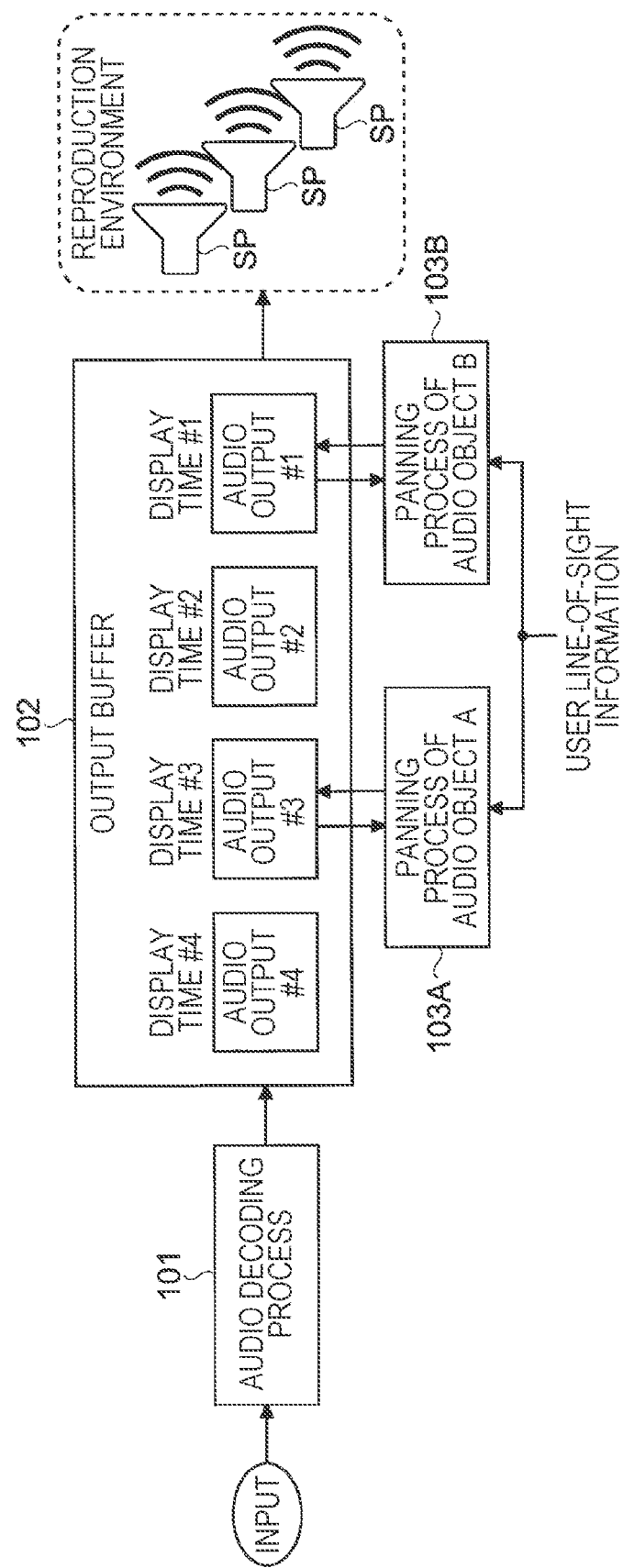
FIG. 9 is a diagram for describing a flow of an audio reproduction according to a first embodiment.

For example, as illustrated in FIG. 9, for the audio object B, for which high accuracy in the image-audio synchronization is demanded because the audio source location is close to the viewing/listening location of the user or the like, a panning process (103B) using the user line-of-sight information is performed when an audio output #1 is stored in a buffer area of a display time #1 immediately before the audio output.

For the audio object A, for which the high accuracy in the image-audio synchronization is not demanded because the audio source location is far from the viewing/listening location of the user or the like, a panning process (103A) using the user line-of-sight information is performed when an audio output #3 is stored in a buffer area of a display time #3, which has some time margin from the audio output.

Consequently, for the audio object B, for which high accuracy in the image-audio synchronization is demanded, the panning process 103B is performed on the basis of the user line-of-sight information immediately before the audio output.

Therefore, minimization of the spatial deviation in the image-audio synchronization is enabled. Further, the panning process 103B of the audio object B, for which high accuracy in the image-audio synchronization is demanded, and the panning process 103A of the audio object A, for which the high accuracy in the image-audio synchronization is not demanded, can be distributed and can be distributed.

Therefore, suppression of a defect occurrence such as the audio skipping or the audio cracking is enabled.

2.1 Example of MPEG-H 3D Audio Rendering

Subsequently, three-dimensional panning of an audio object according to the present embodiment will be described. Here, a description will be given with regard to an example of a case of separately delivering an audio object and audio metadata of the MPEG-H 3D Audio bitstream by a plurality of pieces of audio metadata and the common audio object.

According to the MPEG-H 3D Audio standard, location information in a three-dimensional space is recorded as metadata for every audio source (the audio object). Therefore, by referring to such location information, it is possible to determine whether or not high accuracy is demanded for the image-audio synchronization for every audio source (the audio object). Therefore, in the present embodiment, an opportunity (a timing) of the rendering process is decided for every audio object according to a determination result based on this single law.

Figure 10:
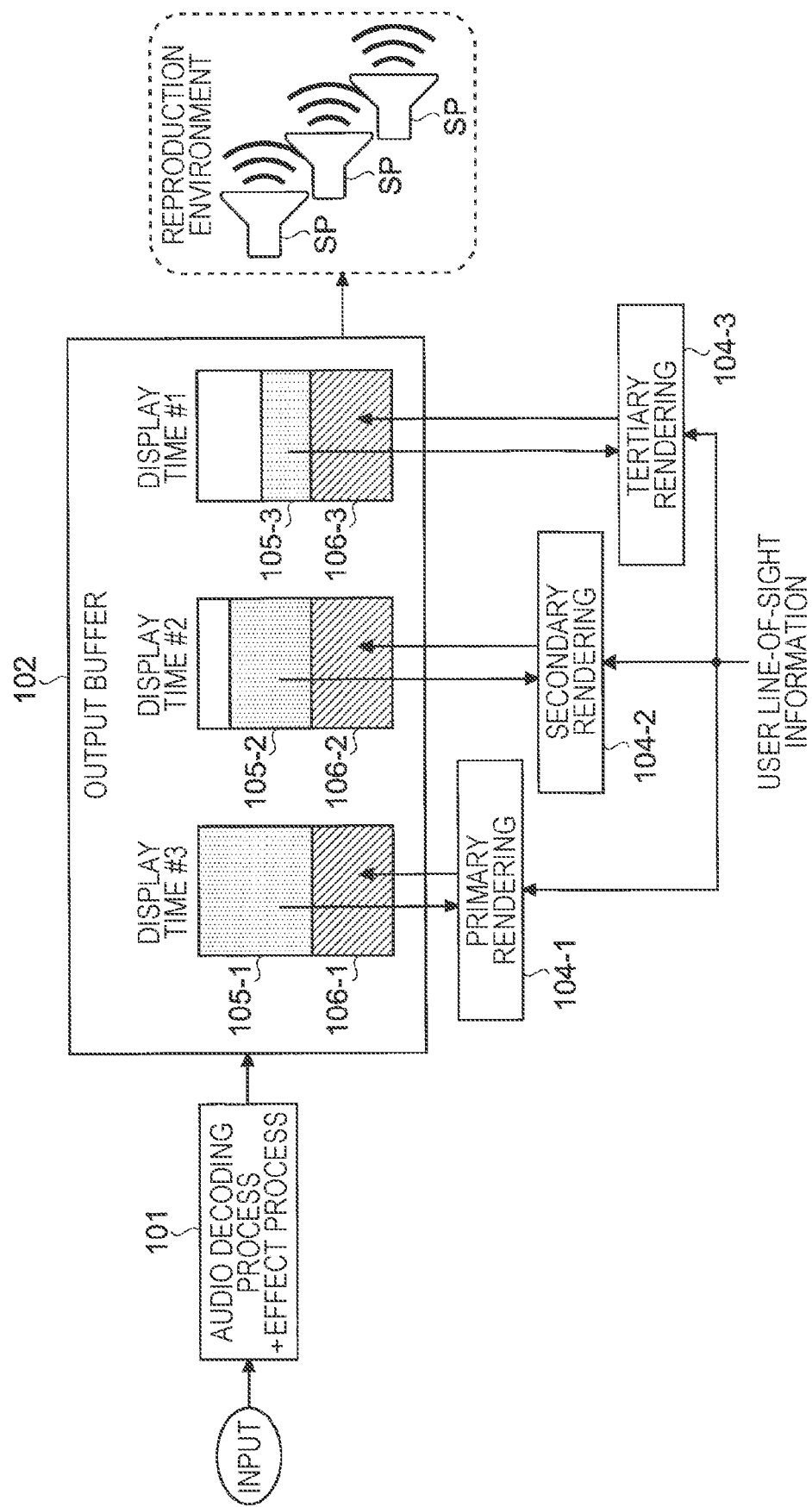
FIG. 10 is a diagram for describing a flow of rendering (three-dimensional panning) according to the first embodiment.

FIG. 10 is a diagram for describing a flow of rendering (three-dimensional panning) according to the present embodiment. As shown in FIG. 10, in the present embodiment, the audio object is subjected to a rendering process evenly at three rendering opportunities of primary rendering 104-1, secondary rendering 104-2, and tertiary rendering 104-3.

A case where three audio objects A, B, and C are output from a reproduction environment including the five speakers SP1 to SP5 is described as an example.

For example, the flow of a process is as follows.

An audio object A (105-1), which is output as audio at the display time #3, is mapped to the five speakers SP1 to SP5 in the primary rendering 104-1 (106-1).

An audio object B (105-2), which is output as audio at the display time #2, is mapped to the five speakers in the secondary rendering 104-2 (106-2).

An audio object C (105-3), which is output as audio at the display time #3, is mapped to the five speakers in the tertiary rendering 104-3 (106-3).

However, the audio objects A, B, and C can also be mapped to the five speakers SP1 to SP5 in the primary rendering 104-1, or the audio objects A and B can be mapped to the five speakers SP1 to SP5 in the primary rendering 104-1, and the audio object C can be mapped to the five speakers SP1 to SP5 in the secondary rendering 104-2.

The final output audio is mixing (superimposition) of rendering results for the respective audio sources (the audio objects).

Hence, even in a case where the rendering processes (104-1 to 104-3) are performed at once or are divided into a plurality of times, the final output data to be obtained and the process cost are the same.

In addition, there are various methods for scheduling the rendering opportunities.

For example, the process of outputting audio data to be output (audio output) to the speaker is periodically performed, and the primary rendering 104-1, the secondary rendering 104-2, and the tertiary rendering 104-3 may be performed in accordance with output opportunities.

Figure 11:
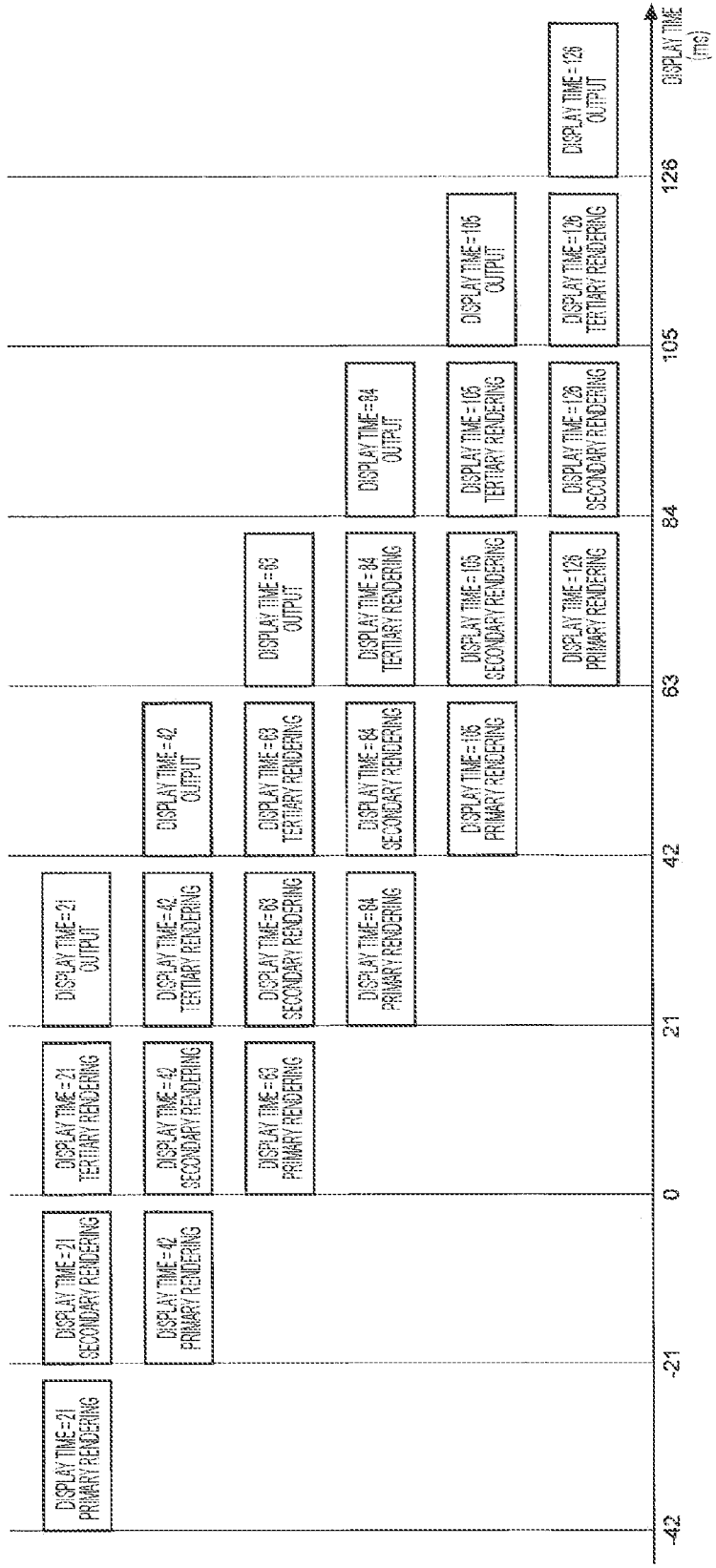
FIG. 11 is a diagram for describing a flow from the rendering to the audio output from a data viewpoint according to the first embodiment.

FIG. 11 is a diagram for describing a flow from the rendering to the audio output from a data viewpoint according to the present embodiment. The example of FIG. 11 shows, for example, a case where an audio source having a sampling rate of 48,000 Hz (Hertz) is encoded by MPEG-H 3D Audio so that a single access unit includes an audio sample of 1,024 bits. In such a case, a single access unit corresponds to about 21 milliseconds.

In the example shown in FIG. 11, the process of outputting the output audio to the speaker SP is performed at a cycle of about 21 milliseconds. Therefore, the primary rendering 104-1, the secondary rendering 104-2, and the tertiary rendering 104-3 are performed in a proportional distribution manner during a cycle of each 21 milliseconds.

It is to be noted that FIG. 11 shows, as an example, a case where the rendering can be performed before a first display time by defining a negative display time.

2.2 System Configuration

Next, a reproduction device (corresponding to a part or the entirety of the information processing device or the information processing system) according to the present embodiment will be described in detail with reference to the drawings.

A reproduction device 1 according to the present embodiment has, for example, an MPEG-H 3D Audio bitstream decoding function and a rendering function, so as to decode an MPEG-H 3D Audio bitstream, perform rendering to correspond to an arrangement of the speakers SP in the reproduction environment, and output an audio signal (corresponding to an audio output) that has been generated accordingly to the speaker SP.

In the MPEG-H 3D Audio standard, the rendering of an audio object corresponds to deriving of a speaker gain by three-dimensional panning. That is, in the present description, "panning" and "rendering" may have similar meanings.

Further, the reproduction device 1 has a function of acquiring the user line-of-sight information and speaker layout information.

The user line-of-sight information may be, for example, a mouse operation in a PC application, head tracking information in a virtual reality (VR) reproduction, or the like.

The speaker layout information is information regarding a reproduction environment of an audio object, and may be, for example, layout information of the speaker SP in the reproduction environment constructed by a user or a third party. For example, Section 8.2 "Channel configuration" of Non-Patent Document 2 shows a method for encoding a speaker arrangement. The speaker layout information according to the present embodiment may be information that has been generated according to such an encoding method.

Further, the reproduction device 1 may have a function of accepting user settings. For example, the reproduction device 1 may acquire "whether or not to provide an intermediate data storage section 14" and "whether or not to track the line-of-sight information of the user", as user settings.

"Whether or not to provide the intermediate data storage section 14" is, for example, a user setting for controlling whether or not to save a memory area used for reproducing a content (referred to as a memory setting), and may be a function corresponding to a so-called memory saving option. Such a memory setting may be, for example, set by the user himself/herself or set on a reproduction content provider side (a server side), in consideration of the specifications (a reproducing capability) of the reproduction device 1 on the user side.

"Whether or not to track" may be, for example, a user setting for controlling whether or not to track the line-of-sight direction of the user in the panning process (hereinafter, referred to as a tracking setting). It is to be noted that whether or not to track the line-of-sight direction of the user depends on a user's preference.

Therefore, in a case where the user does not desire, it is possible to set not to track the line-of-sight direction of the user. In such a case, there is no need to change the localization by the panning process.

Figure 12:
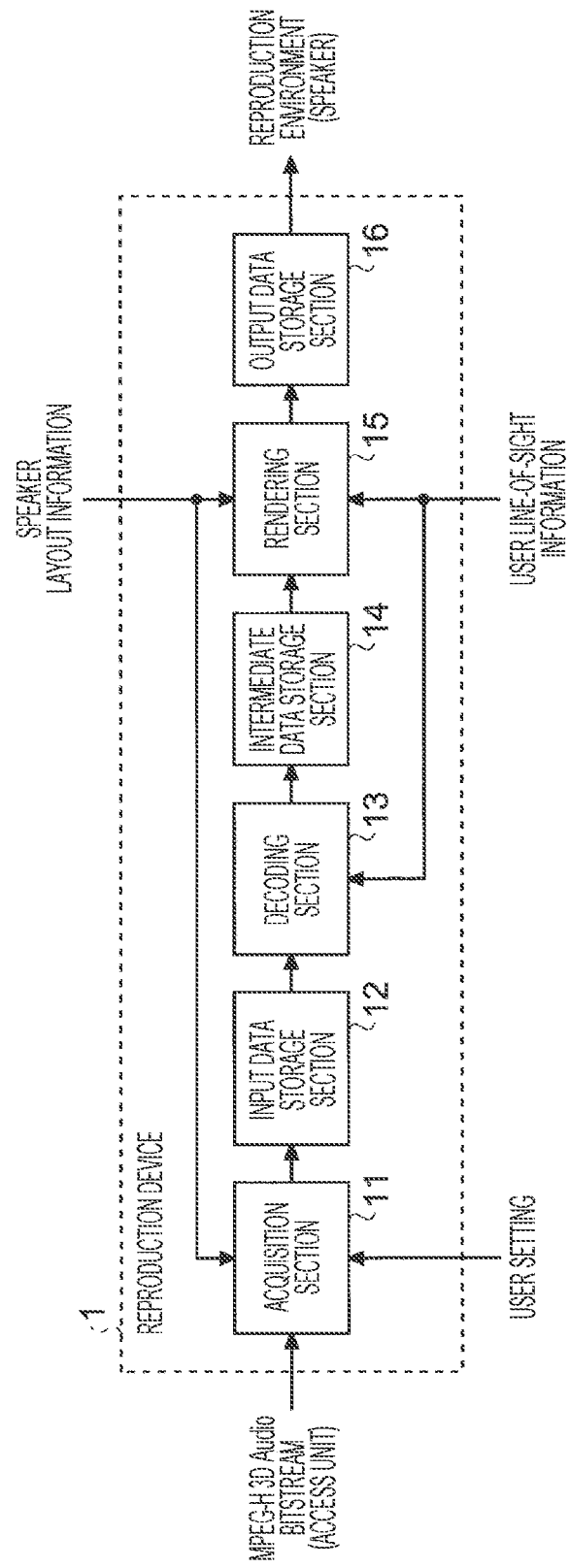
FIG. 12 is a block diagram showing a schematic configuration example of a reproduction device according to the first embodiment.

FIG. 12 is a block diagram showing a schematic configuration example of the reproduction device according to the present embodiment. As shown in FIG. 12, the reproduction device 1 includes, for example, an acquisition section 11, an input data storage section 12, a decoding section 13, an intermediate data storage section 14, a rendering section 15, and an output data storage section 16.

(Acquisition Section 11)

The acquisition section 11 acquires an MPEG-H 3D Audio bitstream (a bitstream having a structure in which the above-described access units are connected in the order of the display times, and a data structure in which a byte length and the number of objects of every access unit are included is added to the beginning as a header) from a storage area connected with the reproduction device 1 or a server (including a cloud or the like) connected with the reproduction device 1 via a predetermined network.

It is to be noted that various networks such as a local area network (LAN), a wide area network (WAN), the Internet, and a mobile communication network may be applied to the predetermined network.

Upon acquisition of the MPEG-H 3D Audio bitstream, the acquisition section 11 first analyzes the header of the MPEG-H 3D Audio, and then continuously acquires the access units of the MPEG-H 3D Audio. In this situation, the acquisition section 11 specifies an access unit length indicating the data length of the access unit and the number of objects from the header of the MPEG-H 3D Audio, and records the access unit length and the number of objects, as input data, in the input data storage section 12. In such a situation, the acquisition section 11 also records the MPEG-H 3D Audio access unit that has been acquired, as the input data, in the input data storage section 12.

Further, in a case where the access unit is recorded in the input data storage section 12, the acquisition section 11 calculates the display time of the access unit on the basis of a serial number of the access unit from the beginning of the bitstream. The display time that has been calculated is recorded, as the input data, in the input data storage section 12.

Further, the acquisition section 11 decides the number of rendering process stages on the basis of the total number of speakers (also referred to as the number of output destinations) obtained from speaker layout information, the number of objects, and, in some cases, user settings. The number of rendering process stages that has been decided is recorded as the input data, in the input data storage section 12, in a similar manner to the number of objects, the access unit, and the display time.

Here, the number of rendering process stages may be the number of rendering processes performed in a time-series order on a plurality of audio objects included in a single access unit. For example, in a case where the audio objects included in a single access unit are grouped into three groups, the number of rendering process stages is decided to be 'three'.

It is to be noted that the grouping of the plurality of audio objects included in a single access unit may be performed on the basis of, for example, image-audio synchronization accuracy demanded for each audio object. The image-audio synchronization accuracy demanded for each audio object may be, for example, a distance between an audio object (an audio source) and a user on a two-dimensional plane or in a three-dimensional space specified from the metadata accompanied by the audio object, or may be an index acquired on the basis of the user line-of-sight information or the like.

(Input Data Storage Section 12)

The input data storage section 12 is, for example, a storage unit arranged on a memory area such as a static random access memory (SRAM) or a dynamic random access memory (DRAM) included in the reproduction device 1, and as described above, stores the access unit of the MPEG-H 3D Audio, the access unit length of the access unit, the number of audio objects included in the access unit, the display time of the access unit, and the number of rendering process stages that has been decided, as the input data, in the time-series order according to the serial number from the beginning of the MPEG-H 3D Audio bitstream. It is to be noted that the access unit length, the number of objects, the display time, and the number of rendering process stages may be treated as metadata added to the access unit (hereinafter, referred to as additional data).

(Decoding Section 13)

The decoding section 13 reads input data (for example, the access unit of the MPEG-H 3D Audio and additional data) one by one from the input data storage section 12, and separates the access unit of the input data that has been read into an audio object and metadata. Then, the decoding section 13 performs a decoding process on each of the audio object and the metadata that have been separated into, and records a decoding result as intermediate data in the intermediate data storage section 14.

Here, a more detailed block configuration example of the decoding section 13 according to the present embodiment will be described with reference to FIG. 13.

Figure 13:
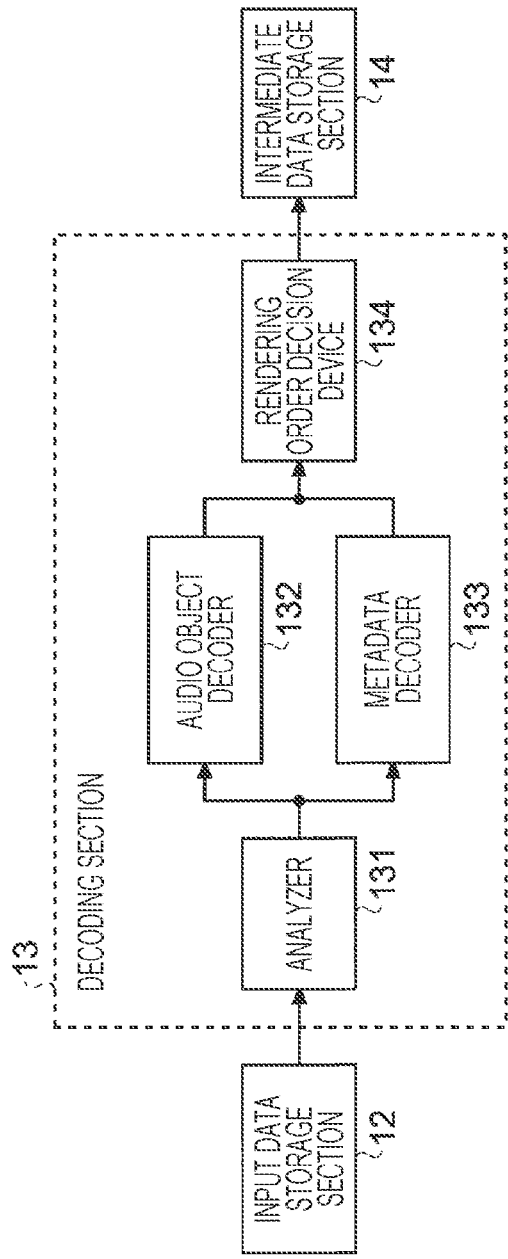
FIG. 13 is a block diagram showing a more detailed block configuration example of a decoding section according to the first embodiment.

As shown in FIG. 13, the decoding section 13 includes, for example, an analyzer 131, an audio object decoder 132, a metadata decoder 133, and a rendering order decision device 134.

Analyzer 131

The analyzer 131 reads the access unit of the MPEG-H 3D Audio from the input data storage section 12, and analyzes the access unit that has been read. Specifically, the access unit is separated into an audio object and metadata, and the audio object is input into the audio object decoder 132 and the metadata is input into the metadata decoder 133.

It is to be noted that it is possible to store a plurality of audio objects and metadata in a single access unit.

Therefore, in such a case, a plurality of audio objects for every access unit is input into the audio object decoder 132.

Audio Object Decoder 132

The audio object decoder 132 decodes the audio object data that has been encoded in the access unit of the MPEG-H 3D Audio. Then, the audio object decoder 132 inputs an audio object length indicating the data length of the audio object that has been decoded and the audio object that has been decoded into the rendering order decision device 134.

It is to be noted that in a case where a plurality of pieces of audio object data is input from the analyzer 131, the number of the audio object decoders 132 same with the number of the plurality of audio objects may be operated in parallel, or a single audio object decoder 132 may decode a plurality of pieces of the audio object data in a time division manner.

Metadata Decoder 133

The metadata decoder 133 decodes the metadata in the access unit of the MPEG-H 3D Audio. Then, the metadata decoder 133 inputs a metadata length indicating the data length of the metadata that has been decoded and the metadata that has been decoded into the rendering order decision device 134.

It is to be noted that in a case where a plurality of pieces of metadata is input from the analyzer 131, the number of the metadata decoders 133 same with the number of the plurality of pieces of metadata may be operated in parallel, or a single metadata decoder 133 may decode a plurality of pieces of the metadata in a time division manner.

Rendering Order Decision Device 134

The rendering order decision device 134 is a configuration of deciding, for example, an execution timing of rendering for each audio object, and decides a rendering order corresponding to the execution timing of the rendering for the audio object, for every audio object that has been input from the audio object decoder 132, from the location information included in the metadata corresponding to the audio object out of the metadata that has been input from the metadata decoder 133.

By deciding the rendering order as described above, the decoding section 13 records the length of the audio object that has been decoded, the audio object that has been decoded, the metadata length that has been decoded, the metadata that has been decoded, the object number, and the rendering order that has been decided, in an intermediate data format, in the intermediate data storage section 14.

It is to be noted that for the object number, the order in the decoding process of the audio object may be used without change.

Further, in a display time field of the intermediate data, the display time of the input data that has been input from the input data storage section 12 into the decoding section 13 is recorded without change.

In an object number field, the number of objects of the input data that has been input from the input data storage section 12 into the decoding section 13 is also recorded without change.

(Intermediate Data Storage Section 14)

The intermediate data storage section 14 is, for example, a storage unit arranged on a memory area such as an SRAM or a DRAM included in the reproduction device 1.

As described above, the audio object length that has been decoded, the audio object that has been decoded, the metadata length that has been decoded, the metadata that has been decoded, the object number, the rendering order that has been decided, the display time, and the number of objects are recorded and retained in the intermediate data format.

(Rendering Section 15)

The rendering section 15 reads the intermediate data (for example, the audio object that has been decoded and the metadata that has been decoded) from the intermediate data storage section 14, and performs a rendering process based on the metadata on the audio object that has been read. Then, the rendering section 15 stores a result obtained by such a rendering process, in the output data storage section 16.

It is to be noted that the user line-of-sight information, the speaker layout information, and the like may be input into the rendering section 15. The rendering section 15 may perform the rendering process on each audio object on the basis of the user line-of-sight information and the speaker layout information that have been input, and the like.

Here, a more detailed block configuration example of the rendering section 15 according to the present embodiment will be described with reference to FIG. 14.

Figure 14:
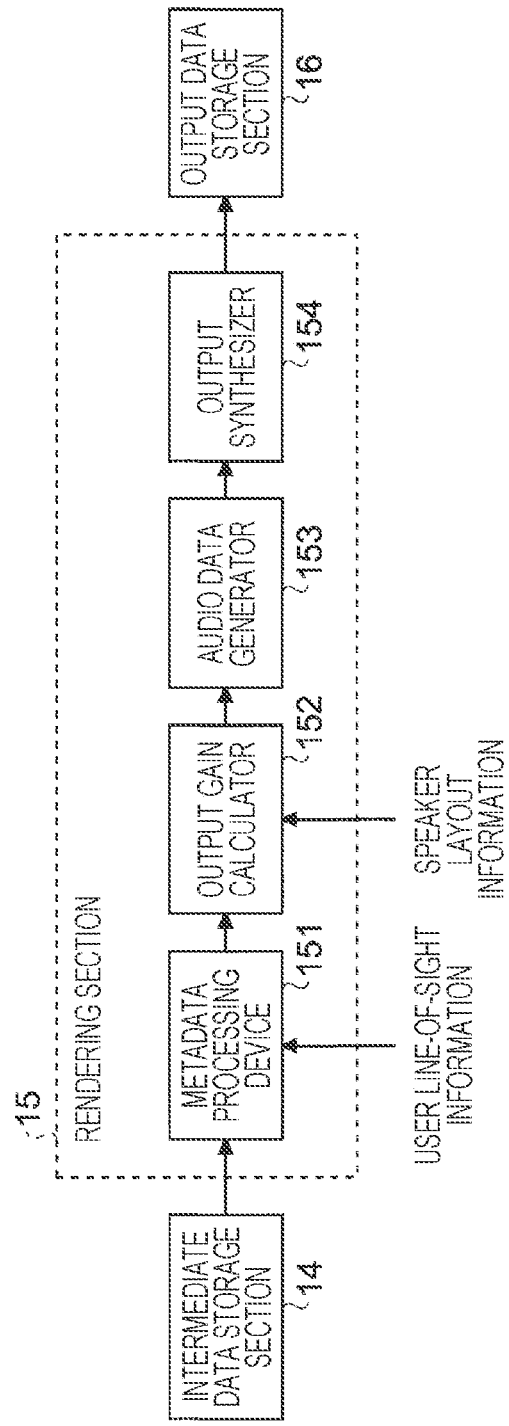
FIG. 14 is a block diagram showing a more detailed block configuration example of a rendering section according to the first embodiment.

As shown in FIG. 14, the rendering section 15 includes, for example, a metadata processing device 151, an output gain calculator 152, an audio data generator 153, and an output synthesizer 154. The metadata processing device 151, the output gain calculator 152, and the audio data generator 153 constitute, for example, a rendering processing section that generates output data for each audio object that is a rendering result.

Metadata Processing Device 151

The metadata processing device 151 processes the metadata in the intermediate data that has been read from the intermediate data storage section 14.

More specifically, the metadata processing device 151 inputs the user line-of-sight information at the time when the metadata is processed, and adds the user line-of-sight information to spatial location information of the metadata. Then, the metadata processing device 151 writes back the spatial location information that has been updated into the metadata. The metadata that has been updated is input into the output gain calculator 152.

Output Gain Calculator 152

The output gain calculator 152 calculates a linear gain for each speaker SP (an output destination) for every audio object on the basis of the metadata that has been input from the metadata processing device 151.

Audio Data Generator 153

The audio data generator 153 applies the linear gain for each speaker SP for every audio object that has been calculated by the output gain calculator 152, and generates audio data to be output to each speaker SP. In such a situation, the audio data generator 153 generates audio data corresponding to the number of the speakers SP from a single audio object. The audio data that has been generated and the audio data length indicating the data length of the audio data are input into the output synthesizer 154.

Output Synthesizer 154

The output synthesizer 154 adds the audio data that has been output from the audio data generator 153 to the audio data that is recorded in the output data storage section 16. The audio data is added for every speaker SP (the output destination).

It is to be noted that in the output data storage section 16, a plurality of pieces of audio data is recorded for every display time, in some cases. In such cases, the output synthesizer 154 adds the audio data to the output data at the display time that coincides with the display time of the intermediate data that has been input from the intermediate data storage section 14 into the rendering section 15.

(Output Data Storage Section 16)

The output data storage section 16 has a configuration corresponding to the output buffer 102 described above, and is, for example, a storage section arranged on a memory area such as an SRAM or a DRAM included in the reproduction device 1.

As described above, the total audio data for every speaker SP (the output destination) is retained as output data.

2.3 Data Formats of Input Data, Intermediate Data, and Output Data

Next, a description will be given with regard to the respective data formats of the input data to be stored in the input data storage section 12, the intermediate data to be stored in the intermediate data storage section 14, and the output data to be stored in the output data storage section 16.

(Input Data)

FIG. 15 is a diagram showing an example of a data format of input data according to the present embodiment. The MPEG-H 3D Audio bitstream that has been acquired by the acquisition section 11 is recorded in the input data storage section 12, as input data in the data format shown as an example in FIG. 15.

In the present embodiment, the MPEG-H 3D Audio bitstream is acquired in the unit of access units. Therefore, as shown in FIG. 15, the input data storage section 12 has a configuration for mainly recording the access units.

However, the access unit length, the number of objects, the display time, and the number of rendering process stages as described above are recorded as additional data necessitated for reproduction.

Display Time

Among the input data formats, the display time is a field for recording the display time of the access unit. The acquisition section 11 records, in a display time field, the display time that has been calculated on the basis of a serial number of the access unit in the MPEG-H 3D Audio bitstream.

Number of Objects

The number of objects is a field for recording the total number of audio objects included in the access unit. It is to be noted that the total number of metadata matches the total number of audio objects. The acquisition section 11 analyzes the header of the MPEG-H 3D Audio bitstream, and records the number of objects that have been specified, in a number of objects field.

Access Unit Length

The access unit length is a field for recording the size of the access unit in the unit of bytes. The acquisition section 11 analyzes the header of the MPEG-H 3D Audio bitstream, and records the size of the access unit that has been specified, in an access unit length field.

Number of Rendering Process Stages

The number of rendering process stages is a field for recording the number of the rendering processes. The acquisition section 11 determines how many times the rendering process should be separately performed, and records the number of times as the number of rendering process stages, in a rendering process stage number field.

Access Unit

An access unit is a field for recording the body of the access unit. The acquisition section 11 records the access unit that has been extracted from the MPEG-H 3D Audio bitstream, in an access unit field.

(Intermediate Data)

FIG. 16 is a diagram showing an example of a data format of intermediate data according to the present embodiment. The audio object and the metadata as a result of having been decoded by the decoding section 13 are recorded as intermediate data in the data format shown as an example in FIG. 16, in the intermediate data storage section 14. In addition to the audio object and the metadata, the display time and the number of objects included in the additional data, the audio object length, the metadata length, the object number, and the rendering order for designating a rendering opportunity are stored in the intermediate data storage section 14. The object number can be used as a link between the audio object and the metadata, but can also function as a flag indicating "rendering completed" to be described later.

Display Time

Among the intermediate data formats, the display time is a field for recording the display time of the audio object and the metadata to be recorded as the intermediate data. The rendering order decision device 134 records the value in the display time field in the input data without change, in the display time field of the intermediate data.

Number of Objects

The number of objects is a field for recording the total number of audio objects to be recorded as the intermediate data. The rendering order decision device 134 records the value in the object number field of the input data without change, in the object number field of the intermediate data.

Audio Object Length

The audio object length is a field for recording the size of the audio object in the unit of bytes. It is to be noted that the size of all audio objects may be the same. The rendering order decision device 134 records the audio object length that has been passed on from the audio object decoder 132, in the audio object length field of the intermediate data.

Metadata Length

The metadata length is a field for recording the size of the metadata in the unit of bytes. It is to be noted that the size of all the metadata may be the same. The rendering order decision device 134 records the metadata length that has been passed on from the metadata decoder 133, in the metadata length field of the intermediate data.

Object Number

The object number is a field for recording the object number of the audio object. The rendering order decision device 134 records the number determined by the audio object decoder 132, in the object number field of the intermediate data. For example, for the audio object and the metadata on which the rendering process has been completed, the rendering order decision device 134 records "−1" in the object number field of the audio object and the metadata. Accordingly, that the rendering process for the audio object and the metadata has been completed (rendering completed) is indicated (a compression process of the intermediate data storage section 14).

Rendering Order

The rendering order is a field for recording the rendering order for each audio object and metadata that have been decided by the rendering order decision device 134. It is to be noted that in a case where the value of the rendering order is "−1", the rendering order may be defined as indefinite. The rendering order decision device 134 records the rendering order that has been decided for every audio object and metadata, in a rendering order field of the intermediate data.

Audio Object

The audio object is a field for recording an audio object corresponding to an object number. The rendering order decision device 134 records the audio object data that has been passed on from the audio object decoder 132, in an audio object field of the intermediate data.

Metadata

The metadata is a field for recording metadata corresponding to the object number. The rendering order decision device 134 records the metadata that has been passed on from the metadata decoder 133, in a metadata field of the intermediate data.

(Output Data)

FIG. 17 is a diagram showing an example of a data format of the output data according to the present embodiment. The audio data as a result of having been rendered by the rendering section 15 is recorded, in the output data storage section 16, as output data in the data format shown as an example in FIG. 17.

Display Time

The display time is a field for recording a display time of output data. The output synthesizer 154 records the value in the display time field of the intermediate data without change, in a display time field of the output data.

Number of Output Destinations

The number of output destinations is, for example, a field for recording the number of the speakers SP (the output destinations) constituting the reproduction environment. The output synthesizer 154 records the value of the total number of the speakers SP that has been obtained by the output gain calculator 152 from the speaker layout information, in an output destination number field of the output data.

Output Audio Data Length

An output audio data length is a field for recording the size of the audio data to be output in the unit of bytes. The output synthesizer 154 records the output audio data length that has been passed on from the audio data generator 153, in an output audio data length field. It is to be noted that the size of the output audio data may be the same at all the output destinations.

Output Audio Data

Output audio data is a field for recording the audio data to be output. The output synthesizer 154 records the audio data that has been passed on from the audio data generator 153, in an output audio data field for every output destination (the speaker SP).

2.4 about Data Structure in Intermediate Data Storage Section

Figure 18:
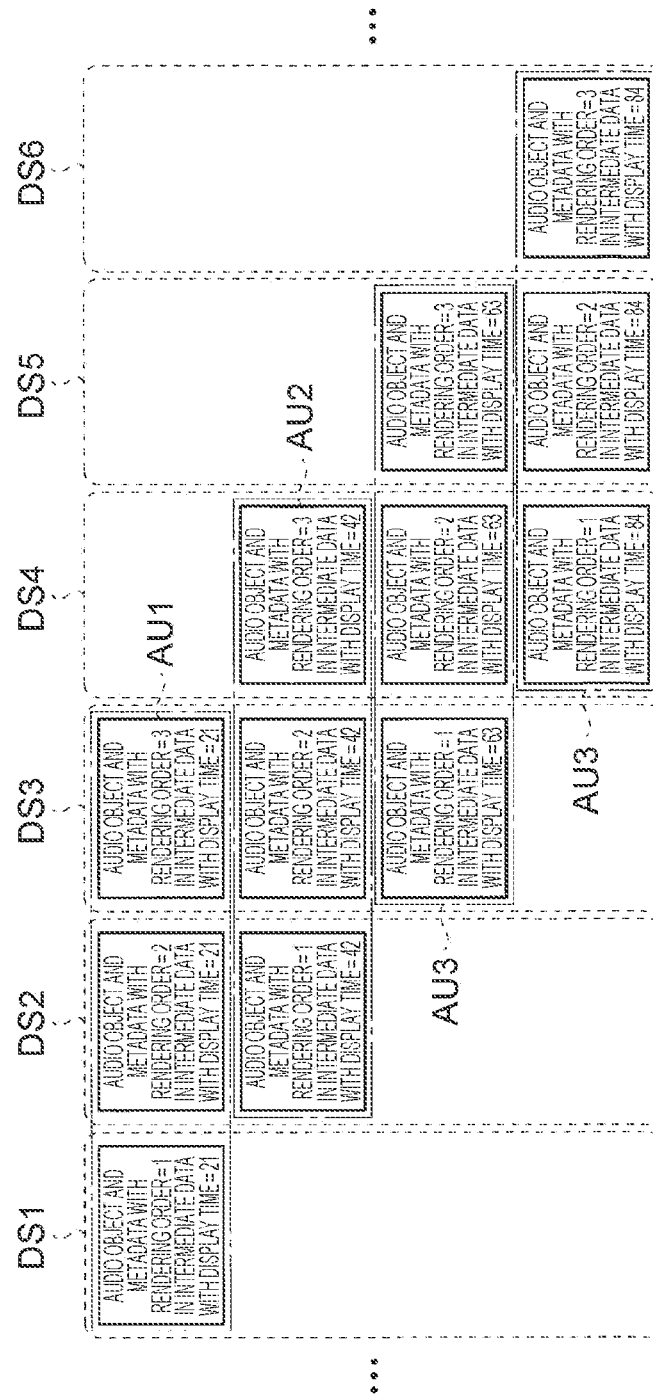
FIG. 18 is a diagram for conceptually describing an example of a data structure of the intermediate data in an intermediate data storage section according to the first embodiment.

Here, the data structure of the intermediate data stored in the intermediate data storage section 14 will be described. FIG. 18 is a diagram for conceptually describing an example of a data structure of the intermediate data in the intermediate data storage section according to the present embodiment. It is to be noted that in FIG. 18 and in the following description, for simplification, a description will be given with regard to the case where the MPEG-H 3D Audio bitstream shown in FIG. 11, as an example, is input as input data. In such an example, it is assumed that four access units AU1 to AU4 with the respective display times=21, 42, 63, and 84 are input as input data, the acquisition section 11 decides that the number of the rendering process stages of the respective access units AU1 to AU4 is three, and at least one set of the audio object and the metadata is assigned to each stage.

As shown in FIG. 18, in the intermediate data storage section 14, the data structure is constructed such that among the pairs of the audio objects and metadata included in a plurality of access units, the pair to be subjected to the rendering process at the same opportunity constitute a single data set.

For example, a dataset DS1 to be rendered on an opportunity of the primary rendering for the access unit with the display time=21 includes an audio object and metadata that have been decided to have a rendering order=1 in the access unit with the display time=21.

A dataset DS2 to be rendered on an opportunity of the primary rendering for an access unit with the display time=42 includes an audio object and metadata that have been decided to have a rendering order=2 in the access unit with the display time=21, and an audio object and metadata that have been decided to have a rendering order=1 in the access unit with the display time=42.

A dataset DS3 to be rendered on an opportunity of the primary rendering for an access unit with the display time=63 includes an audio object and metadata that have been decided to have a rendering order=3 in the access unit with the display time=21, an audio object and metadata that have been decided to have a rendering order=2 in the access unit with the display time=42, and an audio object and metadata that have been decided to have a rendering order=1 in the access unit with the display time=63.

A dataset DS4 to be rendered on an opportunity of the primary rendering for an access unit with display time=84 includes an audio object and metadata that have been decided to have a rendering order=3 in the access unit with the display time=42, an audio object and metadata that have been decided to have a rendering order=2 in the access unit with the display time=63, and an audio object and metadata that have been decided to have a rendering order=1 in the access unit with the display time=84.

A dataset DS5 to be rendered on an opportunity of the secondary rendering for an access unit with the display time=84 includes an audio object and metadata that have been decided to have a rendering order=3 in the access unit with the display time=63, and an audio object and metadata that have been decided to have a rendering order=2 in the access unit with the display time=84.

A dataset DS6 to be rendered on an opportunity of the tertiary rendering for an access unit with the display time=84 includes an audio object and metadata that have been decided to have a rendering order=3 in the access unit with the display time=84.

2.5 Operation Flow

Next, an operation flow according to the present embodiment will be described in detail below with reference to the drawings.

2.5.1 MPEG-H 3D Audio Bitstream Reproduction Flow

First, an MPEG-H 3D Audio bitstream reproduction flow corresponding to the main flow of an operation according to the present embodiment will be described.

Figure 19:
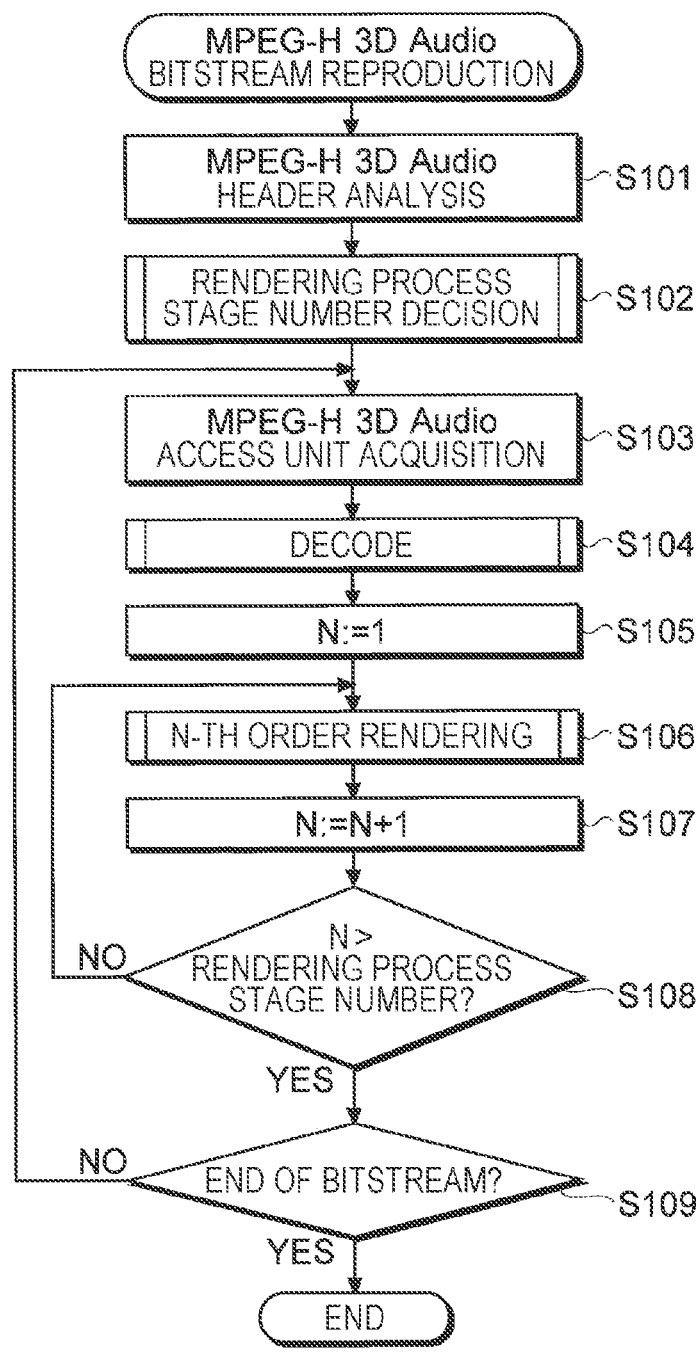
FIG. 19 is a flowchart showing a schematic example of an MPEG-H 3D Audio bitstream reproduction flow according to the first embodiment.

FIG. 19 is a flowchart showing a schematic example of the MPEG-H 3D Audio bitstream reproduction flow according to the present embodiment. As shown in FIG. 19, in the present operation, the acquisition section 11 first analyzes the header of the MPEG-H 3D Audio bitstream that has been received (step S101). The number of objects and the access unit length that have been obtained by this analysis, the display time that has been decided according to the received order of the access unit in the MPEG-H 3D Audio bitstream and the access unit itself are recorded in the input data storage section 12, as described above.

Next, the acquisition section 11 performs a process of deciding the number of rendering process stages (step S102). The details of a rendering process stage number process in step S102 will be described later with reference to FIG. 25.

Next, in the present operation, the decoding section 13 acquires the input data, that is, the access unit of the MPEG-H 3D Audio bitstream from the input data storage section 12 (step S103), and decodes the access unit that has been acquired (step S104). The details of the decoding process in step S104 will be described later with reference to FIG. 20. Further, the intermediate data that has been obtained by this decoding is recorded in the intermediate data storage section 14 as described above.

Next, in the present operation, the rendering section 15 sets a variable N for counting the rendering order to '1', that is, resets the variable N (step S105).

Subsequently, the rendering section 15 acquires an audio object with a rendering order=N and its metadata from the intermediate data storage section 14, and renders the audio object and its metadata that have been acquired (hereinafter, referred to as N-th order rendering) (step S106). The details of an N-th order rendering process in step S106 will be described later with reference to FIG. 21. Further, the output data that has been obtained by the N-th order rendering is added to the audio data with the same display time in the output data storage section 16 as described above.

Next, the rendering section 15 increments the variable N by 1 (step S107), and determines whether or not the variable N that has been incremented exceeds the number of rendering process stages decided in step S102 (step S108).

In a case where the variable N that has been incremented is equal to or less than the number of rendering process stages (NO in step S108), the rendering section 15 returns to step S106 and performs the rendering process of the next order.

On the other hand, in a case where the variable N that has been incremented exceeds the number of rendering process stages (YES in step S108), it is determined whether or not the execution of the above process for the access unit at the end of the MPEG-H 3D Audio bitstream is completed (step S109). This determination may be performed, for example, by a controller (not shown) that controls the entire reproduction device 1, or may be performed by the rendering section 15 of the reproduction device 1.

In a case where the process for the access unit at the end is completed (YES in step S109), the present operation ends. On the other hand, in a case where the process has not reached the access unit at the end (NO in step S109), the present operation returns to step S103, and the operation of step S103 and subsequent steps is performed.

2.5.2 Decoding Process (Step S104)

Figure 20:
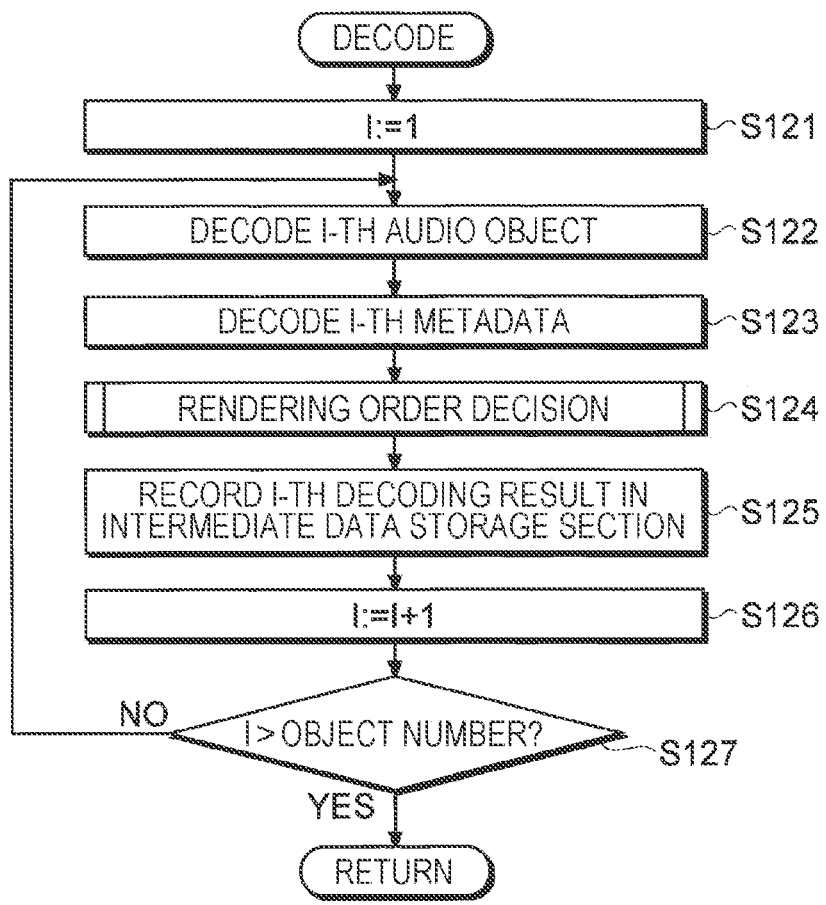
FIG. 20 is a flowchart showing an example of a decoding process according to the first embodiment.

FIG. 20 is a flowchart showing an example of the decoding process according to the present embodiment. As shown in FIG. 20, in the decoding process shown in step S104 of FIG. 19, first, the decoding section 13 sets a variable I for counting the audio objects to '1', that is, resets the variable I (step S121).

Next, the decoding section 13 inputs the I-th audio object among the audio objects included in the access unit acquired in step S103 of FIG. 19 into the audio object decoder 132 to decode the I-th audio object (step S122).

Further, the decoding section 13 inputs the I-th metadata among the metadata included in the access unit acquired in step S103 of FIG. 19 into the metadata decoder 133 to decode the I-th metadata (step S123).

Subsequently, the decoding section 13 decides a rendering order of the I-th audio object on the basis of the I-th metadata that has been decoded (step S124). The details of a rendering order decision process in step S124 will be described later with reference to FIG. 26.

Next, the decoding section 13 records a result that has been obtained by the above-described decoding process and decision process, that is, the I-th audio object and metadata that have been decoded and the duet ring order that has been decided, in the intermediate data storage section 14 (step S125).

Next, the decoding section 13 increments the variable I by (step S126), and determines whether or not the variable I that has been incremented exceeds the number of objects that has been specified by analyzing the header of the MPEG-H 3D Audio bitstream in step S101 of FIG. 19 (step S127).

In a case where the variable I that has been incremented is equal to or less than the number of objects (NO in step S127), the decoding section 13 returns to step S122, and performs the process for the audio object and metadata of the next order.

On the other hand, in a case where the variable I that has been incremented exceeds the number of objects (YES in step S127), the decoding section 13 returns to the operation of FIG. 19, and performs the operation of step S105 and subsequent steps.

2.5.3 N-th Order Rendering Process (Step S106)

Figure 21:
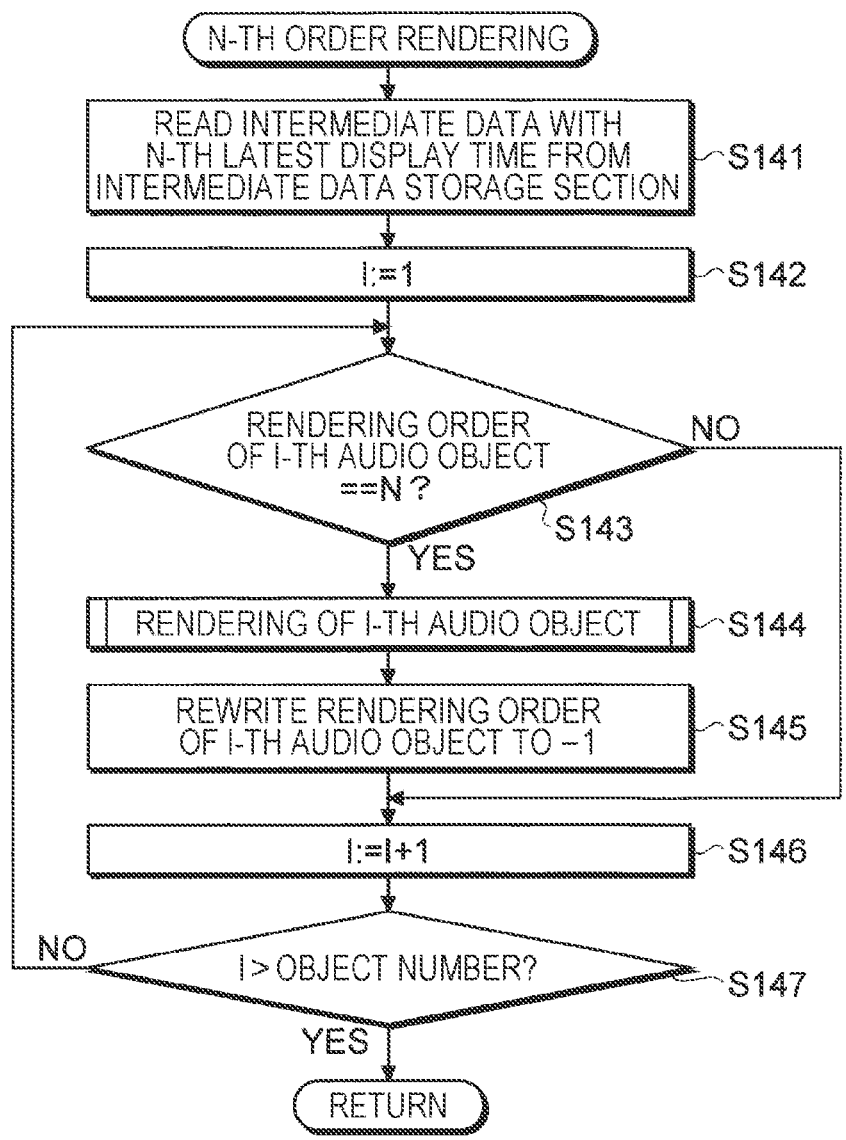
FIG. 21 is a flowchart showing an example of an N-th order rendering process according to the first embodiment.

FIG. 21 is a flowchart showing an example of the N-th order rendering process according to the present embodiment. As shown in FIG. 21, in the N-th order rendering process shown in step S106 of FIG. 19, first, the rendering section 15 reads the intermediate data of the access unit with the N-th latest display time, from among the access units stored in the intermediate data storage section 14 (step S141).

Next, the rendering section 15 sets the variable I for counting the audio object to '1', that is, resets the variable I (step S142).

Next, the rendering section 15 determines whether or not the rendering order of the I-th audio object from among the intermediate data read in step S141 is N (step S143). In a case where the rendering order of the I-th audio object is not N (NO in step S143), the rendering section 15 proceeds to step S146.

On the other hand, in a case where the rendering order of the I-th audio object is N (YES in step S143), the rendering section 15 renders the I-th audio object (step S144). The details of the rendering process of the I-th audio object in step S144 will be described later with reference to FIG. 22.

Then, the rendering section 15 rewrites the rendering order N of the I-th audio object that has been rendered to '−1' (step S145), and the process proceeds to step S146.

In step S146, the rendering section 15 increments the variable I by 1. Then, the rendering section 15 analyzes the header of the MPEG-H 3D Audio bitstream in step S101 of FIG. 19 to determine whether or not the variable I that has been incremented exceeds the number of objects that has been specified (step S147).

In a case where the variable I that has been incremented is equal to or less than the number of objects (NO in step S177), the rendering section 15 returns to step S143, and performs the process for the next audio object.

On the other hand, in a case where the variable I that has been incremented exceeds the number of objects (YES in step S147), the rendering section 15 returns to the operation of FIG. 19, and performs the operation of step S107 and subsequent steps.

2.5.4 Rendering Process of I-th Audio Object (Step S144)

Figure 22:
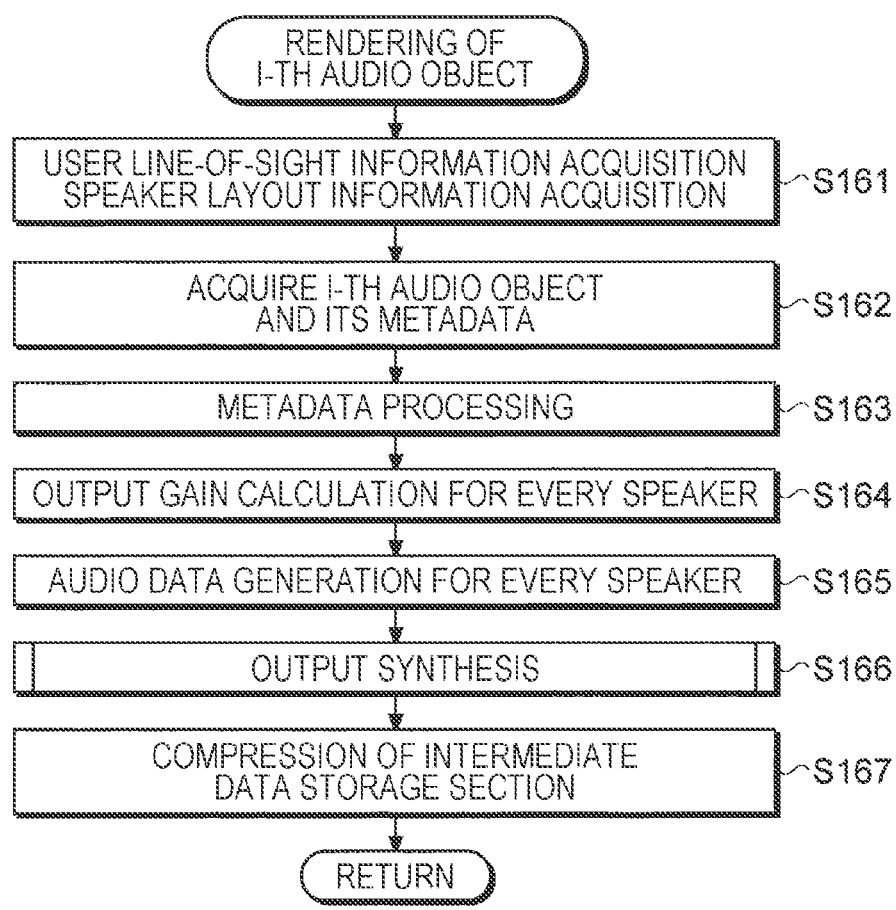
FIG. 22 is a flowchart showing an example of a rendering process of an I-th audio object according to the first embodiment.

FIG. 22 is a flowchart showing an example of the rendering process of the I-th audio object according to the present embodiment. As shown in FIG. 22, in the rendering process of the I-th audio object shown in step S144 of FIG. 21, the rendering section 15 first acquires the user line-of-sight information and the speaker layout information (step S161). It is to be noted that in a case where the reproduction environment is not changed frequently, it is not necessary to input the speaker layout information one by one whenever the operation shown in FIG. 22 is performed.

The speaker layout information that has been input once is retained, and the speaker layout information that is retained may be used.

Next, the rendering section 15 acquires the I-th audio object and its metadata from among the intermediate data read from the intermediate data storage section 14 in step S141 of FIG. 21 (step S162).

Next, the rendering section 15 inputs the metadata acquired in step S162 into the metadata processing device 151 to process the metadata as described above (step S163).

Next, the rendering section 15 inputs the metadata processed in step S163 into the output gain calculator 152, and as described above, calculates an output gain for every speaker SP in the reproduction environment on the basis of the metadata that have been processed (step S164).

Next, the rendering section 15 inputs an output gain (a linear gain) for each speaker SP for every audio object calculated in step S164 and the audio object data into the audio data generator 153 to generate audio data to be output to the respective speakers SP (step S165). In such a situation, the audio data generator 153 generates the audio data for the number of speakers SP from a single audio object, as described above.

Next, the rendering section 15 inputs the audio data generated in step S165 and an audio data length indicating the data length of the audio data into the output synthesizer 154 to perform an output synthesis process in which the audio data at the same display time is added together for every speaker SP (step S166). The details of the output synthesis process in step S166 will be described later with reference to FIG. 23.

Then, the rendering section 15 performs the compression process of the intermediate data storage section 14 (step S167), returns to the operation of FIG. 21, and performs the operation of step S145 and subsequent steps.

2.5.4.1 Output Synthesis Process (Step S166)

Figure 23:
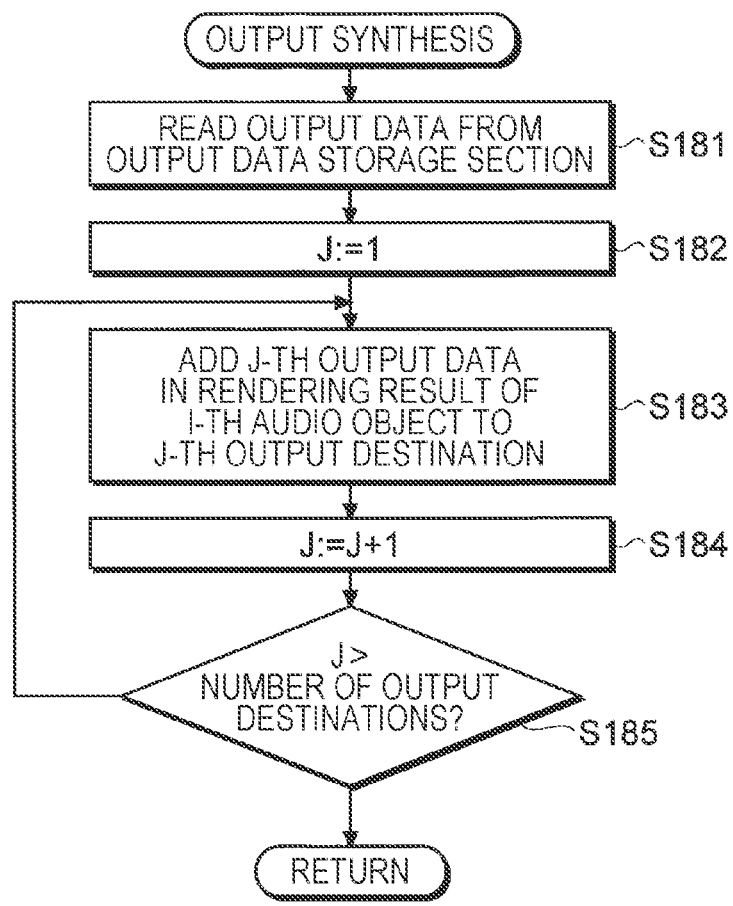
FIG. 23 is a flowchart showing an example of an output synthesis process according to the first embodiment.

Here, an output synthesis process shown in step S166 of FIG. 22 will be described. FIG. 23 is a flowchart showing an example of the output synthesis process according to the present embodiment. As shown in FIG. 23, in the output synthesis process shown in step S166 of FIG. 22, first, the output synthesizer 154 reads the output data stored in the output data storage section 16 (step S181).

Next, the output synthesizer 154 sets a variable J for specifying the output destination speaker SP to '1', that is, resets the variable J (step S182).

Subsequently, the output synthesizer 154 adds the J-th output data in a rendering result for the I-th audio object to the output data of the J-th output destination (the speaker SP) (step S183). As a result, the output data of one or more audio objects are synthesized with respect to the J-th output destination (the speaker SP).

Next, the output synthesizer 154 increments the variable J by 1 (step S184), and determines whether or not the variable that has been incremented exceeds the number of the output destinations (the number of the speakers SP) specified by the speaker layout information (step S185).

In a case where the variable J that has been incremented is equal to or less than the number of the output destinations (NO in step S185), the output synthesizer 154 returns to step S183, and performs the rendering process of the next order.

On the other hand, in a case where the variable J that has been incremented exceeds the number of the output destinations (YES in step S185), the rendering section 15 returns to the operation shown in FIG. 22, and performs the operation of step S167 and subsequent steps.

2.5.4.2 Compression Process of Intermediate Data Storage Section (Step S167)

Next, a compression process of the intermediate data storage section 14 shown in step S167 of FIG. 22 will be described.

In the present embodiment, the intermediate data stored in the intermediate data storage section 14 is not always rendered for every access unit. Therefore, the intermediate data that has not yet been rendered (hereinafter, referred to as unprocessed data) and the intermediate data that has been rendered (hereinafter, referred to as processed data) are both included in the intermediate data storage section 14, and unprocessed data is fragmented in the intermediate data storage section 14, in some cases.

Therefore, in the present embodiment, in order to improve the reusability of the intermediate data storage section 14, a compression process is performed for discarding the processed data in the intermediate data storage section 14 at any time and compressing the unprocessed data.

Hereinafter, the compression process for the intermediate data storage section 14 will be described with reference to a specific example. FIGS. 24A, 24B, and 24C are diagrams showing a specific example for describing the compression process for the intermediate data storage section according to the present embodiment. In the specific example to be described below, as shown in FIG. 24A, intermediate data (the audio objects and their metadata) of the number of objects=6 with object numbers=1 to 6 is stored in the intermediate data storage section 14.

Once the rendering process is performed on the intermediate data with object numbers=1, 3, and 5 (the audio objects and their metadata) from the state shown in FIG. 24A, since then, these pieces of the intermediate data are not referred to by the rendering section 15. Therefore, these pieces of the intermediate data can be deleted from the intermediate data storage section 14.

Therefore, in the present embodiment, as shown in FIG. 24B, the rendering section 15 rewrites, to '−1', the object numbers of the intermediate data (the audio objects and their metadata) with the object numbers=1, 3, and 5, for which the rendering process has been performed.

Then, as shown in FIG. 24C, the rendering section 15 deletes the intermediate data (the audio objects and their metadata) in which the object number '−1' is recorded, in the intermediate data storage section 14.

This process enables deletion of unnecessary intermediate data from the intermediate data storage section 14 and leaving only valid intermediate data (the unprocessed data).

Therefore, an improvement in the reusability of the intermediate data storage section 14 is enabled.

2.5.5 Rendering Process Stage Number Decision Process (Step S102)

Next, a rendering process decision process according to the present embodiment will be described. In the present embodiment, the number of the rendering process stages is the maximum value of the rendering order. This number can correspond to the total number of the intermediate data with different display times and that can exist simultaneously in the intermediate data storage section 14.

It is to be noted that in the present embodiment, the minimum value of the rendering order is '1'. In such a case, by continuously performing the decoding process and the rendering process, the generation and the recording of the intermediate data can be omitted.

Figure 25:
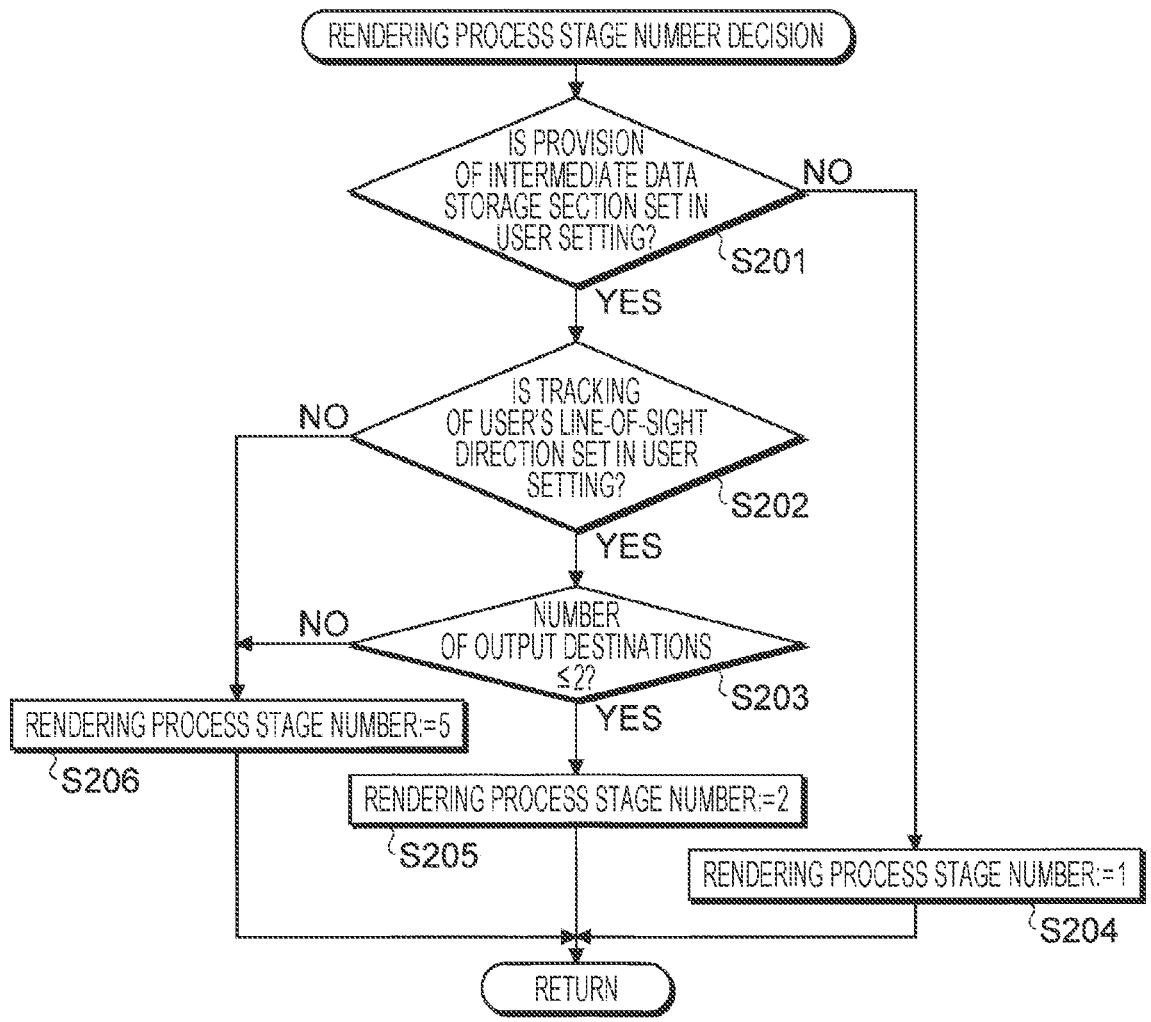
FIG. 25 is a flowchart showing an example of a rendering process stage number decision process according to the first embodiment.

FIG. 25 is a flowchart showing an example of the rendering process stage number decision process according to the present embodiment. As shown in FIG. 25, in the rendering process stage number decision process shown in step S102 of FIG. 19, first, the acquisition section 11 confirms whether or not the provision of the intermediate data storage section 14 is set in a user setting (step S201).

In a case where not providing the intermediate data storage section 14 is set in the user setting (NO in step S201), the acquisition section 11 sets the number of rendering process stages to, for example, '1' (step S204), returns to the operation shown in FIG. 19, and performs the operation of step S103 and subsequent steps.

On the other hand, in a case where the provision of the intermediate data storage section 14 is set in the user setting (YES in step S201), the acquisition section 11 confirms whether or not tracking of the line-of-sight direction of the user is set in the user setting (step S202).

In a case where not tracking of the line-of-sight direction of the user is set in the user setting (NO in step S202), the acquisition section 11 sets the number of rendering process stages to, for example, '5' (step S206), returns to the operation shown in FIG. 19, and performs the operation of step S103 and subsequent steps.

On the other hand, in a case where the tracking of the line-of-sight direction of the user is set in the user setting (YES in step S202), the acquisition section 11 determines whether or not the number of the output destinations, that is, the number of the speakers SP constituting the reproduction environment is equal to or less than a predetermined number (for example, '2') (step S203).

In a case where the number of the output destinations is less than a predetermined number (for example, '2') (NO in step S203), the acquisition section 11 proceeds to, for example, step S206, sets the number of the rendering process stages to, for example, '5' (step S206), returns to the operation shown in FIG. 19, and performs the operation of step S103 and subsequent steps.

On the other hand, in a case where the number of the output destinations is equal to or greater than the predetermined number (for example, '2') (YES in step S203), the acquisition section 11 sets the number of the rendering process stages to, for example, '2' (step S205), returns to the operation shown in FIG. 19, and performs the operation of step S103 and subsequent steps.

2.5.6 Rendering Order Decision Process (Step S124)

Next, the rendering order decision process according to the present embodiment will be described. In the present embodiment, as described above, the rendering order is decided on the basis of the metadata.

Specifically, in the present embodiment, for example, the audio objects are classified with respect to all five categories shown below as examples on the basis of the metadata. The five categories may include, for example, distance classification, movement classification, viewing angle up and down classification, viewing angle left and right classification, and locality classification. However, without being limited to them, with respect to various categories of four or less or six or more, the audio objects may be classified on the basis of the metadata.

Distance Classification

In the distance classification, for example, in a case where the distance from a viewing/listening location to an audio source (an audio object) is short, it is determined that the sensitivity of a viewer/listener to a deviation between the image and the audio is high, and in a case where the distance from the viewing/listening location to the audio source is long, the sensitivity of the viewer/listener to the deviation between the image and the audio is also low.

Such distance classification can be performed, for example, on the basis of a value such as a radius, a gain, or the like in the metadata. For example, in a case where the value such as the radius, the gain, or the like is equal to or less than, for example, 60% of those values (which may be average values) of another audio object, it can be considered that the distance to the audio object from the viewing/listening location is far. In such a case, '0' is set to a score indicating a result of the distance classification. On the other hand, in a case where the values such as the radius, the gain, and the like are less than, for example, 60% of those values (which may be average values) of another audio object, it can be considered that the distance to the audio object from the viewing/listening location is short. In such a case, '1' is set to the score indicating the result of the distance classification. It is to be noted that '60%' in the above description is merely an example, and may be variously modified.

Movement Classification

In the movement classification, for example, in a case where there is almost no movement in an audio source, it is determined that the sensitivity of the viewer/listener to a deviation between the image and the audio is high, and in a case where the movement of the audio source is intense, the sensitivity of the viewer/listener to a deviation between the image and the audio is low.

Such movement classification can be performed on the basis of a difference in, for example, an azimuth, an elevation, or the like in the metadata. For example, in a case where the difference in any one of the azimuth, the elevation, or the like between the access units is equal to or greater than one degree, it can be considered that the movement is large. In such a case, '0' is set to a score indicating a result of the movement classification. On the other hand, in a case where the difference in any one of the azimuth, the elevation, or the like is less than one degree, it can be considered that the movement is small. In such a case, '1' is set to the score indicating the result of the movement classification. It is to be noted that "one degree" in the above description is merely an example, and may be variously modified.

Viewing Angle Up and Down Classification

Viewing Angle Left and Right Classification

In the viewing angle up and down classification and the viewing angle left and right classification, for example, a viewing angle of the viewer/listener is assumed, and it is determined that the sensitivity of an audio source existing in the viewing angle to a deviation between the image and the audio is high, the sensitivity of the audio source existing outside the viewing angle to a deviation between the image and the audio is low.

The viewing angle up and down classification can be performed on the basis of, for example, a value such as the elevation in the metadata. For example, in a case where the audio arriving from an upper direction or a lower direction, that is, an elevation angle of an audio source with respect to the viewer/listener does not fall within up and down 30 degrees, the location of the audio source with respect to the viewer/listener can be regarded as an outside of the viewing angle. In such a case, '0' is set to a score indicating a result of the viewing angle up and down classification. On the other hand, in a case where the elevation angle of the audio source with respect to the viewer/listener falls within up and down 30 degrees, the location of the audio source with respect to the viewer/listener can be regarded as an inside of the viewing angle. In such a case, '1' is set to the score indicating the result of the viewing angle up and down classification.

The viewing angle left and right classification can be performed, for example, on the basis of a value such as the azimuth in the metadata. For example, in a case where an audio outside the front, that is, the azimuth angle of the location of the audio source with respect to the viewer/listener does not fall within left and right 45 degrees, the location of the audio source with respect to the viewer/listener can be regarded as an outside of the viewing angle. In such a case, '0' is set to a score indicating a result of the viewing angle left and right classification. On the other hand, in a case where the azimuth angle of the location of the audio source with respect to the viewer/listener falls within left and right 45 degrees, the location of the audio source with respect to the viewer/listener can be regarded as an inside of the viewing angle. In such a case, '1' is set to the score indicating the result of the viewing angle left and right classification.

Locality Classification

In the locality classification, for example, it is determined that in a case where the distribution of the audio sources is spatially uniform (a feeling of being wrapped is strong), the sensitivity of the viewer/lister to a deviation between the image and the audio is low, and the distribution of the audio sources is local (the feeling of being wrapped is weak) the sensitivity of the viewer/lister to a deviation between the image and the audio is high.

Such locality classification can be performed, for example, on the basis of a value such as a spread in the metadata. For example, in a case where the value such as the spread is equal to or greater than 90 degrees, it can be considered that the locality is low. In such a case, '0' is set to a score indicating a result of the locality classification. On the other hand, in a case where the value such as the spread is less than 90 degrees, it can be considered that the locality is high. In such a case, '1' is set to the score indicating the result of the locality classification.

In the present embodiment, in a case where whenever each classification is conducted and it is classified as "the sensitivity of the viewer/listener to a deviation between the image and the audio is high", the rendering order is incremented by 1, on the basis of the score in each classification result. The rendering order that is large means that it is necessary to render at an opportunity much closer to the audio output, and following the line-of-sight in real time is demanded.

Figure 26:
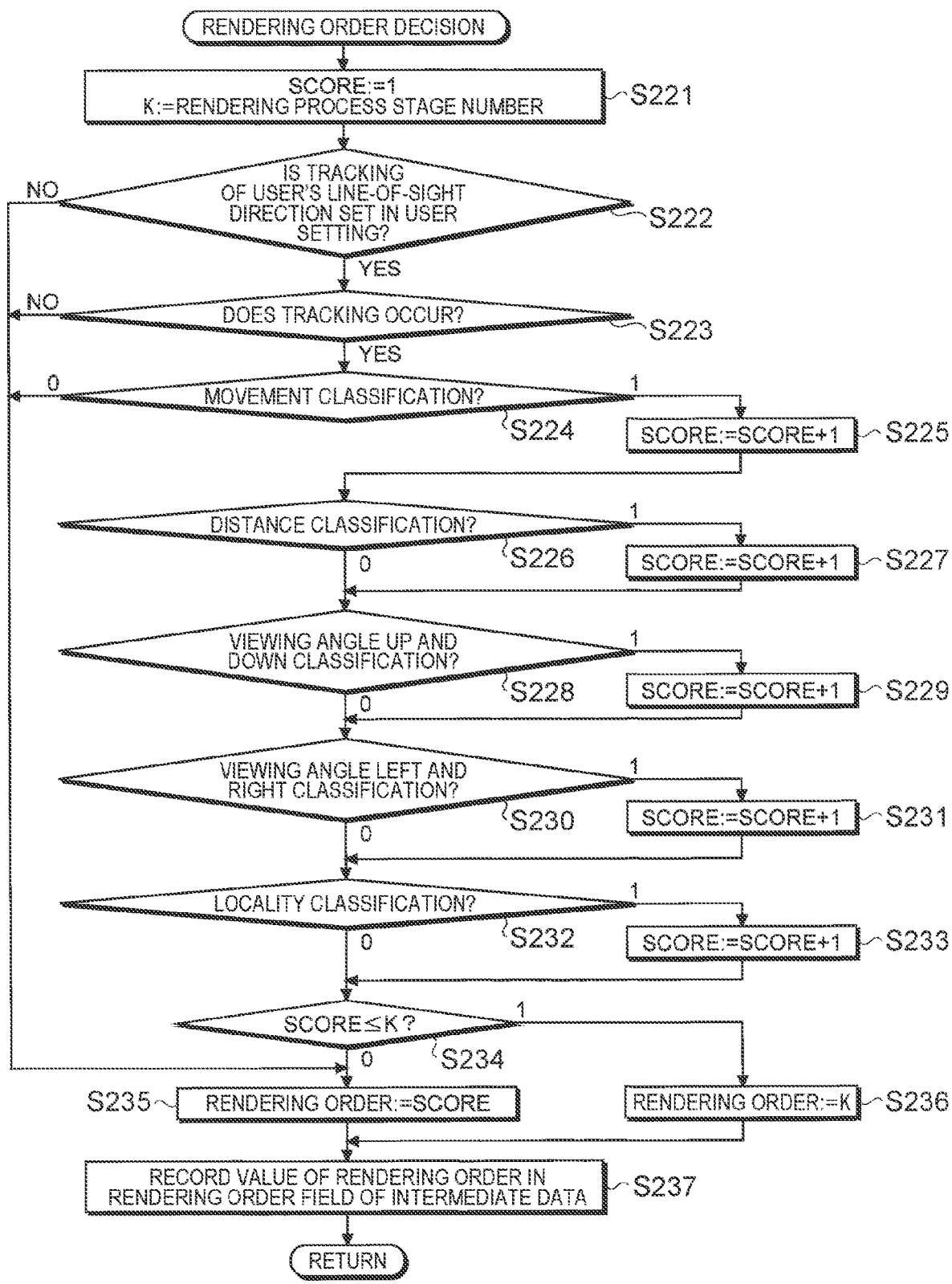
FIG. 26 is a flowchart showing an example of a rendering order decision process according to the first embodiment.

FIG. 26 is a flowchart showing an example of the rendering order decision process according to the present embodiment. As shown in FIG. 26, in the rendering order decision process shown in step S124 of FIG. 20, the decoding section 13 first sets the initial value '1' to the score (SCORE) indicating the rendering order, and also sets the number of rendering process stages K decided in step S102 of FIG. 19 (see FIG. 25 for details) to the number of the rendering process stages (step S221).

Next, the decoding section 13 confirms whether or not tracking of the line-of-sight direction of the user is set in the user setting (step S222).

In a case where the not tracking of the line-of-sight direction of the user is set in the user setting (NO in step S222), the decoding section 13 proceeds to step S235, and decides a value of the current SCORE as the rendering order. Therefore, the rendering order, of a case where not tracking of the line-of-sight direction of the user is set, has an initial value (=1).

On the other hand, in a case where the tracking of the line-of-sight direction of the user is set in the user setting (YES in step S222), the decoding section 13 first determines whether or not the tracking of the line-of-sight direction of the user has occurred (step S223). Whether or not the tracking of the line-of-sight direction of the user has occurred can be determined on the basis of, for example, whether or not the user line-of-sight information has been input from the outside.

In a case where the tracking of the line-of-sight direction of the user has not occurred (NO in step S223), the decoding section 13 proceeds to step S235, and decides the current SCORE value as the rendering order, in a similar manner to the case where not tracking of the line-of-sight direction of the user is set in the user setting (NO in step S222).

On the other hand, in a case where the tracking of the line-of-sight direction of the user has occurred (YES in step S223), the decoding section 13 first performs the movement classification (step S224). As a result of the movement classification, in a case where it is determined that the movement of the audio source with respect to the viewer/listener is small (SCORE='0' in step S224), the decoding section 13 proceeds to step S235, and decides the current SCORE value as the rendering order, in a similar manner to the case where the tracking of the line-of-sight direction of the user has not occurred (NO in step S223).

On the other hand, in a case where it is determined that the movement of the audio source with respect to the viewer/listener is large (SCORE='1' in step S224), the decoding section 13 adds '1' to the current SCORE (step S225), and proceeds to step S226.

In step S226, the decoding section 13 performs, for example, the distance classification. In a case where it is determined that the distance from the viewer/listener to the audio source is short as a result of the distance classification (SCORE='1' in step S226), the decoding section 13 adds '1' to the current SCORE (step S227), and proceeds to step S228. On the other hand, in a case where it is determined that the distance from the viewer/listener to the audio source is long (SCORE='0' in step S226), the decoding section 13 directly proceeds to step S228.

In step S228, the decoding section 13 performs, for example, the viewing angle up and down classification. As a result of the viewing angle up and down classification, in a case where it is determined that the elevation angle of the audio source with respect to the viewer/listener falls within a predetermined range (for example, up and down 30 degrees) (SCORE='1' in step S228), the decoding section 13 adds '1' to the current SCORE (step S229), and proceeds to step S230. On the other hand, in a case where it is determined that the elevation angle of the audio source with respect to the viewer/listener does not fall within the predetermined range (SCORE='0' in step S228), the decoding section 13 directly proceeds to step S230.

In step S230, the decoding section 13 performs, for example, the viewing angle left and right classification. As a result of the viewing angle left and right classification, in a case where it is determined that the azimuth angle of the audio source location with respect to the viewer/listener falls within a predetermined range (for example, left and right 45 degrees) (SCORE='1' in step S230), the decoding section 13 adds '1' to the current SCORE (step S231), and proceeds to step S232. On the other hand, in a case where it is determined that the azimuth angle of the location of the audio source with respect to the viewer/listener does not fall within the predetermined range (SCORE='0' in step S230), the decoding section 13 directly proceeds to step S232.

In step S232, the decoding section 13 performs, for example, the locality classification. As a result of the locality classification, in a case where it is determined that the distribution of the audio sources is spatially uniform (the feeling of being wrapped is strong) (SCORE='1' in step S232), the decoding section 13 adds '1' to the current SCORE (step S233), and proceeds to step S234. On the other hand, in a case where it is determined that the distribution of the audio sources is local (the feeling of being wrapped is weak) (SCORE='0' in step S232), the decoding section 13 directly proceeds to step S234.

In step S234, the decoding section 13 determines whether or not the value of the current SCORE is equal to or less than the number of rendering process stages K.

In a case where it is equal to or less than the number of rendering process stages (YES in step S234), the decoding section 13 determines the current SCORE value to the rendering order (step S235), and in a case where it is greater than the number of rendering process stages (NO in step S234), the decoding section 13 determines the rendering order to be the same value with the number of rendering process stages K (step S236), and then proceeds to step S237.

In step S237, the decoding section 13 stores the rendering order determined in step S235 or S236 in the rendering order field of the intermediate data, then returns to the operation shown in FIG. 20, and performs the operation of step S125 and subsequent steps.

2.6 Decision of Rendering Order on Content Generation Side

It is to be noted that the rendering order of each audio object may be decided on an MPEG-H 3D Audio bitstream generation side (a server side). In such a case, the rendering order of each audio object may be embedded in the MPEG-H 3D Audio bitstream as a part of the metadata for delivering.

The rendering order that has been decided on the content generation side may be stored in a field for the rendering order prepared in a metadata field of the MPEG-H 3D Audio bitstream, for example, as an example shown in FIG. 27.

The rendering order can be statically set, for example, in a case of authoring an MPEG-H 3D Audio bitstream. In addition, the rendering order can be generated beforehand using an optional algorithm for the rendering order decision.

In this manner, in a case where the rendering order that has been decided by a content generation device is embedded in the MPEG-H 3D Audio bitstream and is delivered, the reproduction device 1 is capable of acquiring the rendering order that has been decided beforehand from the MPEG-H 3D Audio bitstream.

Therefore, a further improvement in the accuracy of the rendering order is enabled.

3. Second Embodiment

Next, an information processing device and an information processing method according to a second embodiment of the present disclosure will be described in detail with reference to the drawings.

In the first embodiment described above, the case of reproducing the MPEG-H 3D Audio (audio) has been described.

However, the technique according to the present disclosure is not limited to the audio reproduction, and is applicable to video reproduction, for example, reproduction of a free-viewpoint video content, and the like. Therefore, in the second embodiment, a case where the free-viewpoint video content is reproduced will be described with examples. It is to be noted that a video content such as the free-viewpoint video may include an audio content. In such a case, for the reproduction of the audio content, for example, the reproduction device 1, which has been described in the first embodiment, may be used.

3.1 System Configuration

Figure 28:
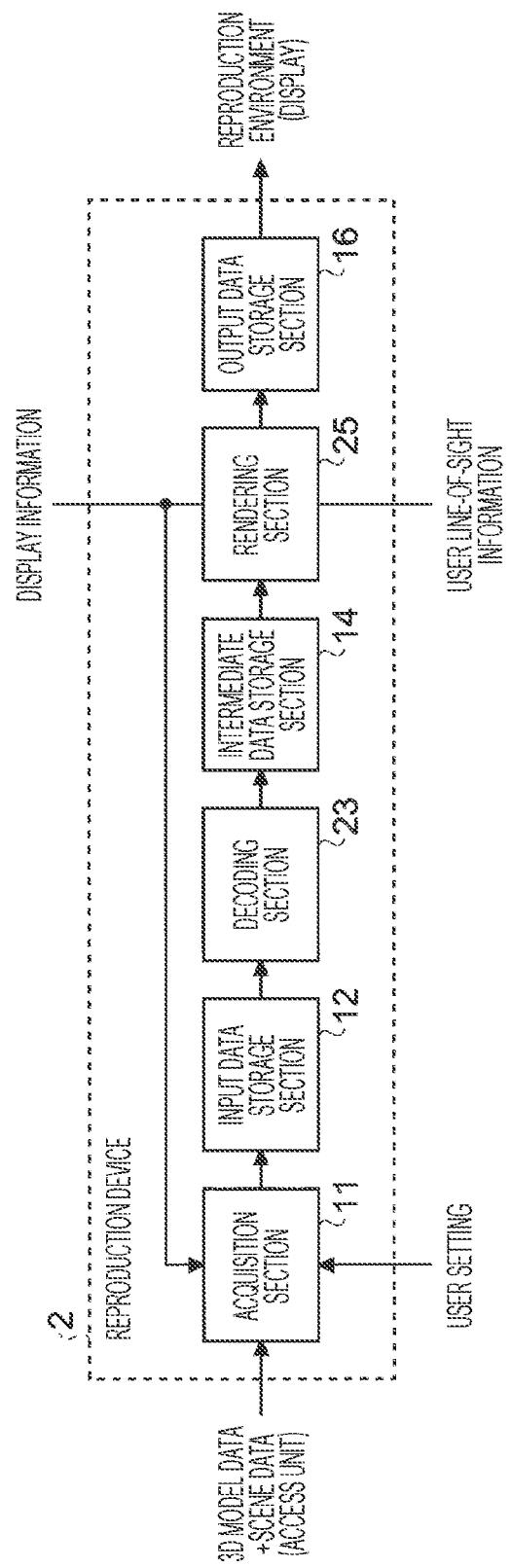
FIG. 28 is a block diagram showing a schematic configuration example of a reproduction device according to a second embodiment.

FIG. 28 is a block diagram showing a schematic configuration example of a reproduction device according to the present embodiment. As shown in FIG. 28, a reproduction device 2 has a configuration similar to the reproduction device 1, which has been described with reference to FIG. 12 in the first embodiment, and the decoding section 13 is replaced with a decoding section 23, and the rendering section 15 is replaced with a rendering section 25. Further, in the present embodiment, the reproduction environment to which output data is output includes a display device such as a display (including an HMD).

It is to be noted that in the present embodiment, the audio object in the first embodiment is replaced with a video object (three-dimensional model data), and the metadata is replaced with scene data. Further, in the present embodiment, instead of the speaker layout information, display information including information such as a display resolution is used.

In a case where the video content is delivered in a bitstream as in the present embodiment, the video object itself in the video content is encoded as three-dimensional model data, and spatial arrangement information of the video object is separately encoded as scene data. Therefore, a bitstream including three-dimensional model data and scene data is input into the reproduction device 2 in the unit of access units.

In the reproduction device 2, a plurality of three-dimensional model data is rendered for every three-dimensional model data on the basis of the scene data and the user line-of-sight information.

By superimposing (synthesizing) such rendering results, two-dimensional display data (corresponding to output data) to be displayed on a display is generated. In such a situation, by adaptively deciding an opportunity of the rendering process for every three-dimensional model data, and performing the rendering process for every three-dimensional model data at the opportunity that has been decided, load distribution of rendering is enabled while eliminating a deviation between the line-of-sight of the user and a video representation.

(Decoding Section 23)

Figure 29:
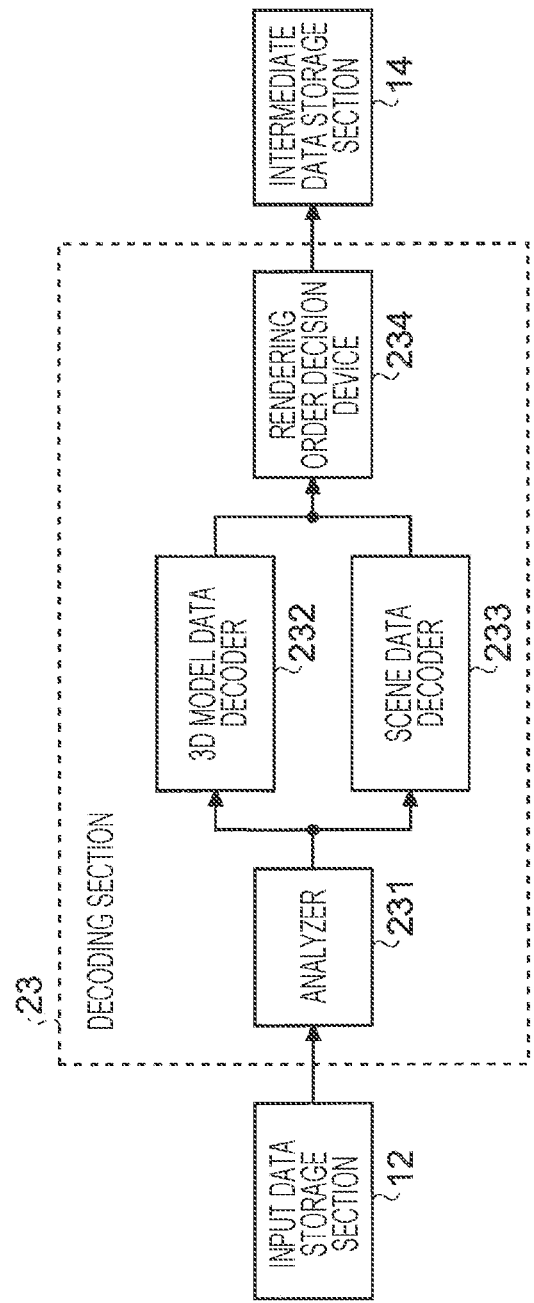
FIG. 29 is a block diagram showing a schematic configuration example of a decoding section according to the second embodiment.

FIG. 29 is a block diagram showing a schematic configuration example of a decoding section according to the present embodiment. As shown in FIG. 29, the decoding section 23 includes an analyzer 231, a three-dimensional model data decoder 232, a scene data decoder 233, and a rendering order decision device 234.

Analyzer 231

The analyzer 231 has a configuration corresponding to the analyzer 131 in the decoding section 13, reads an access unit of the free viewpoint video content from the input data storage section 12, and analyzes the access unit that has been read. Specifically, the access unit is separated into three-dimensional model data and scene data, and the three-dimensional model data is input into the three-dimensional model data decoder 232, and the scene data is input into the scene data decoder 233.

It is to be noted that since a plurality of pieces of three-dimensional model data and scene data can be stored in a single access unit.

Therefore, in such a case, a plurality of pieces of three-dimensional model data for every access unit is input into the three-dimensional model data decoder 232.

Three-Dimensional Model Data Decoder 232

The three-dimensional model data decoder 232 has a configuration corresponding to the audio object decoder 132 in the decoding section 13, and decodes the three-dimensional model data that has been encoded in the access unit of the free viewpoint video content. Then, the three-dimensional model data decoder 232 inputs the three-dimensional model data length indicating a data length of the three-dimensional model data that has been decoded and the three-dimensional model data that has been decoded, into the rendering order decision device 234.

It is to be noted that in a case where a plurality of pieces of audio object data is input from the analyzer 231, the number of a plurality of the three-dimensional model data decoders 232 same with the number of the plurality of pieces of three-dimensional model data may be operated in parallel, or a single three-dimensional model data decoder 232 may decode the plurality of pieces of three-dimensional model data sequentially in a time division manner.

Scene Data Decoder 233

The scene data decoder 233 has a configuration corresponding to the metadata decoder 133 in the decoding section 13, and decodes the scene data in the access unit of the free viewpoint video content. Then, the scene data decoder 233 inputs a scene data length indicating the data length of the scene data that has been decoded and the scene data that has been decoded, into the rendering order decision device 234.

It is to be noted that in a case where a plurality of pieces of scene data is input from the analyzer 231, the number of the scene data decoders 233 same with the number of the plurality of pieces of scene data may be operated in parallel, or a single scene data decoder 233 may decode a plurality of pieces of scene data in a time division manner.

Rendering Order Decision Device 234

The rendering order decision device 234 has a configuration corresponding to the rendering order decision device 134 in the decoding section 13.

The rendering order of the three-dimensional model data is decided from the location information included in the scene data corresponding to the three-dimensional model data in the scene data that has been input from the scene data decoder 233, for every three-dimensional model data that has been input from the three-dimensional model data decoder 232.

In a case where the rendering order is decided as described above, the decoding section 23, in a similar manner to the decoding section 13, records the three-dimensional model data length that has been decoded, the three-dimensional model data that has been decoded, the scene data length that has been decoded, and the scene data that has been decoded, an object number, and the rendering order that has been decoded, in a format of the intermediate data, in the intermediate data storage section 14.

(About Three-Dimensional Model Data)

Here, the three-dimensional model data will be described with specific examples. For example, in MPEG-I Video based Point Cloud Compression, metadata including information for constituting a point cloud from a texture image, a depth image, an occupancy image, and each image is defined. Although details are omitted for simplification, by conducting a perspective projection conversion from a certain viewpoint on point cloud data including the texture image, the depth image, the occupancy image, and the metadata, generation of a two-dimensional video representation of a certain video object is enabled.

That is, in the configuration in which the three-dimensional model data and the scene data defined in MPEG-I Video based Point Cloud Compression are input, the point cloud data at a certain time can be restored from the texture image, the depth image, the occupancy image, and the metadata that have been input as the three-dimensional model data. The point cloud data that has been restored is recorded in the intermediate data storage section 14 by the rendering order decision device 234. The scene data is also recorded in the intermediate data storage section 14 similarly by the rendering order decision device 234.

The rendering order decision device 234 is capable of deciding the rendering order by analyzing the content of the scene data that has been decoded (for example, the rendering order of one (primary rendering) is set to a video object localized at a location away from the viewing/listening location). For example, in a case where a soccer game is reproduced as a free-viewpoint video, the video object to become the background such as a stadium and spectators can be configured to be subjected to the primary rendering, and can be subjected to the secondary rendering, the tertiary rendering, and the like, sequentially from a player far from the user's viewpoint.

(About Data Format of Intermediate Data)

Figure 30:
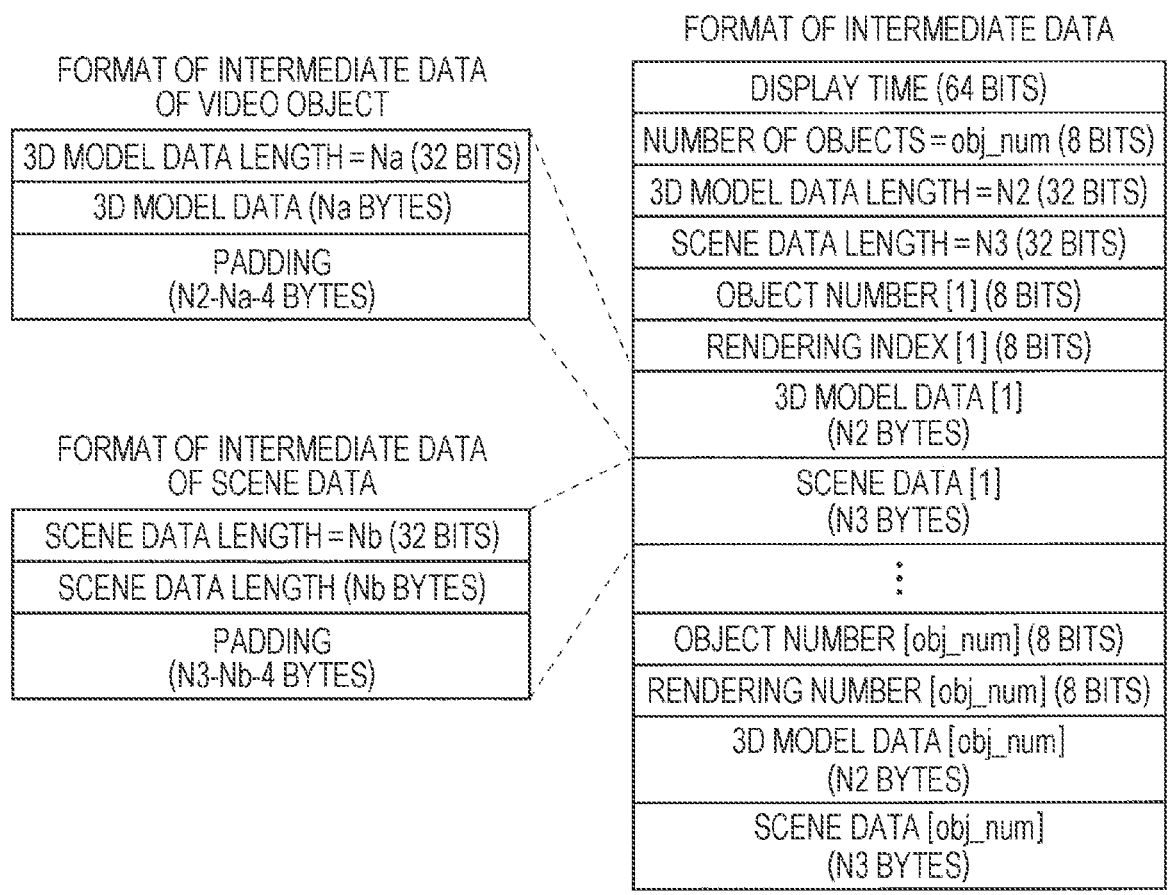
FIG. 30 is a diagram showing an example of a data format of intermediate data according to the second embodiment.

FIG. 30 is a diagram showing an example of a data format of the intermediate data according to the present embodiment. As shown in FIG. 30, in the data format of the intermediate data according to the present embodiment, a field (N2 bytes) for storing the three-dimensional model data is divided, and a three-dimensional model data length (32 bits) and three-dimensional model point cloud data (Na bytes) are stored.

It is to be noted that in a case where a plurality of video objects is input, the three-dimensional model data lengths may be different from each other.

Therefore, a maximum value of the three-dimensional model data length is recorded in the field for storing the three-dimensional model data length.

In a case of recording each video object, a remaining area after storing each piece of three-dimensional model data may be padded to the maximum value of the three-dimensional model data length, so that the field length of the three-dimensional model data field may be kept constant. In addition, in a similar manner, regarding the scene data length, the maximum value of the scene data length may be recorded, and the remaining area may be filled by padding to keep the field length of the scene data field constant.

(Rendering Section 25)

Further, the rendering section 25 according to the present embodiment may have a similar configuration to that of the rendering section 15 according to the first embodiment. However, in the present embodiment, display information is input, instead of the speaker layout information. The display information is information related to the reproduction environment of the video object, and includes, for example, information such as the resolution (the number of pixels) of the display constituting the reproduction environment.

The rendering section 25 performs the rendering process on individual pieces of three-dimensional model data on the basis of the line-of-sight information of the user, the scene data, and the display information, and superimposes (synthesizes) the rendering results of the individual pieces of three-dimensional model data to generate final output data.

Figure 31:
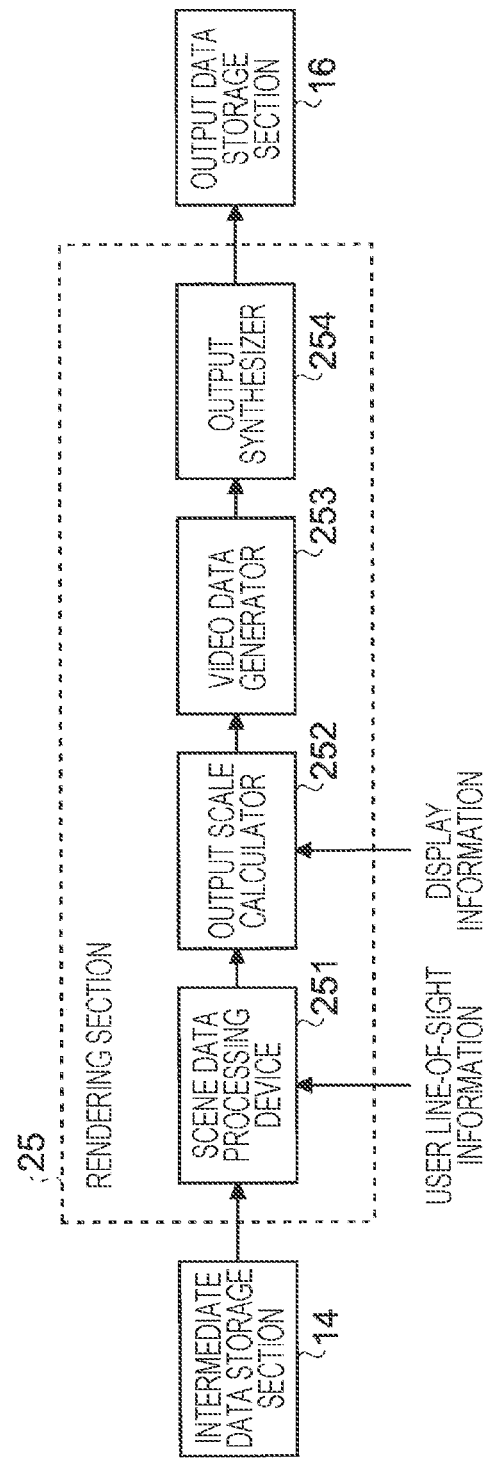
FIG. 31 is a block diagram showing a schematic configuration example of a rendering section according to the second embodiment.

FIG. 31 is a block diagram showing a schematic configuration example of the rendering section according to the present embodiment. As shown in FIG. 31, the rendering section 25 includes a scene data processing device 251, an output scale calculator 252, a video data generator 253, and an output synthesizer 254.

The scene data processing device 251 has a configuration corresponding to the metadata processing device 151 in the rendering section 15, and corrects the spatial arrangement information of the three-dimensional model data included in the scene data on the basis of the user line-of-sight information that has been input.

The output scale calculator 252 has a configuration corresponding to the output gain calculator 152 in the rendering section 15, and calculates a scaling factor (a magnification) in a case where a two-dimensional image is generated from the three-dimensional model data on the basis of the display resolution (the number of pixels) of the display information that has been input.

The video data generator 253 has a configuration corresponding to the audio data generator 153 in the rendering section 15, and generates a two-dimensional image from the three-dimensional model data for each video object that has been recorded as the intermediate data, the spatial arrangement information that has been generated earlier, and the scaling factor.

The output synthesizer 254 has a configuration corresponding to the output synthesizer 154 in the rendering section 15, and generates the final output data (a display output) by superimposing the two-dimensional images of individual video objects.

It is to be noted that in the present embodiment, the rendering order can be statically set at the time of authoring a free-viewpoint video content. In such a case, a field of the rendering order may be added in the metadata of a previous MPEG-I Video based Point Cloud Compression, and the rendering order may be stored in the field.

Further, the reproduction device 2 according to the present embodiment may use the statically set rendering order without change according to a resource state such as a memory consumption amount, or may optionally set the rendering order.

Since other configurations, operations, and effects may be similar to those in the above-described embodiment, detailed description thereof will be omitted here.

4. Hardware Configuration

Next, a hardware configuration example of an information processing device 900 that embodies the reproduction devices 1 and 2 will be described with reference to FIG. 32.

Figure 32:
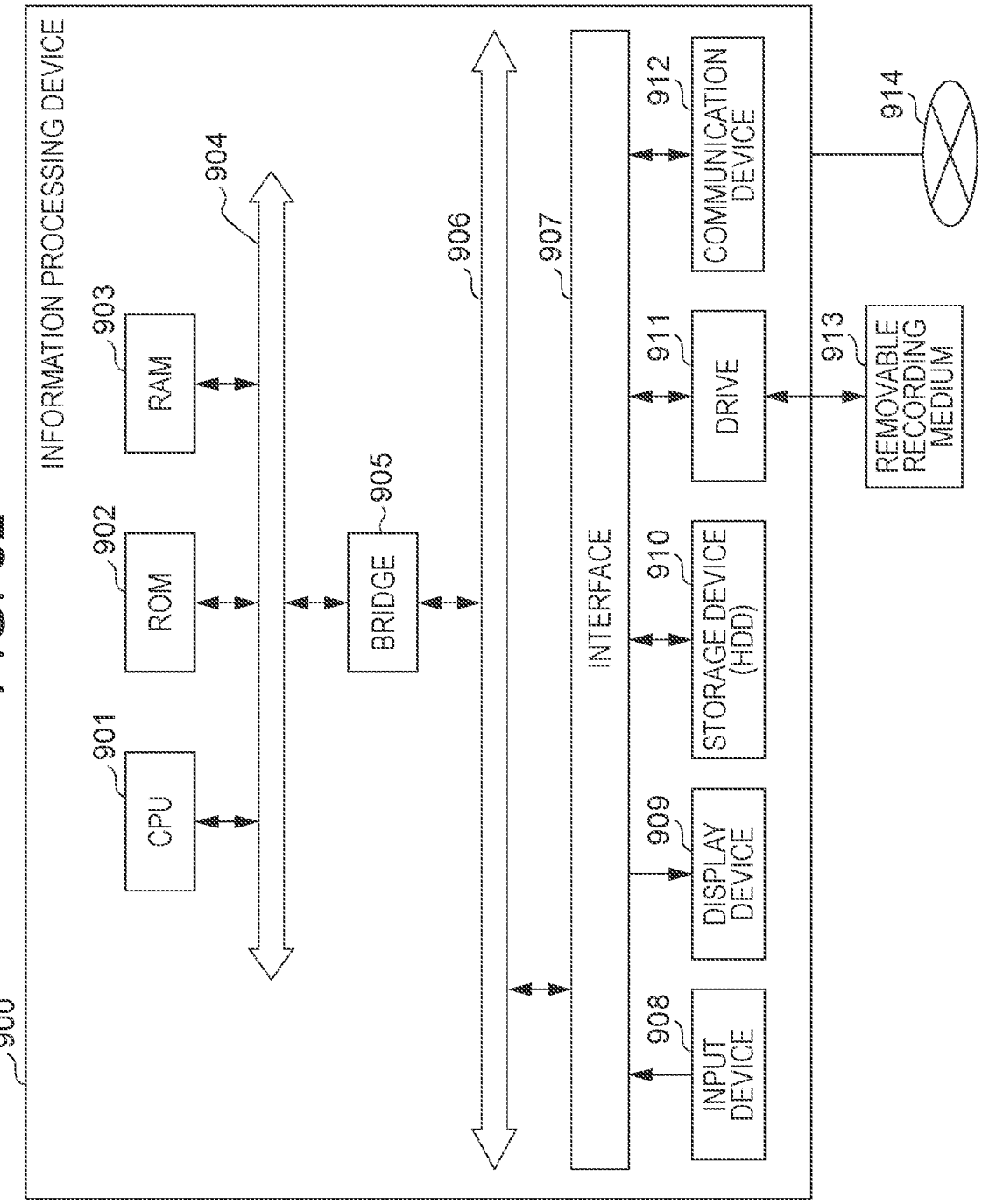
FIG. 32 is a block diagram showing a hardware configuration example of a reproduction device according to an embodiment of the present disclosure.

FIG. 32 is a diagram showing a hardware configuration of the information processing device 900. The information processing device 900 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device, and controls the overall operation in the information processing device 900 according to various programs. Further, the CPU 901 may be a microprocessor. The ROM 902 stores programs, calculation parameters, and the like used by the CPU 901. The RAM 903 temporarily stores a program used in the execution of the CPU 901, parameters that change appropriately in the execution, and the like. These are connected with each other by a host bus 904 including a CPU bus and the like. By the cooperation of the CPU 901, the ROM 902, and the RAM 903, the functions of the respective parts of the reproduction devices 1 and 2 are achieved.

The host bus 904 is connected with an external bus 906 such as a peripheral component interconnect/interface (PCI) bus via the bridge 905. It is to be noted that it is not always necessary to separately configure the host bus 904, the bridge 905, and the external bus 906, and their functions may be implemented on a single bus.

The input device 908 includes an input means for a user to input information such as a mouse, a keyboard, a touch panel, buttons, a microphone, a switch, and a lever, an input control circuit that generates an input signal on the basis of an input made by the user and then outputs the input signal to the CPU 901, and the like. By operating the input device 908, the user is able to input various types of information to the respective devices, and to give an instruction on a process operation. Various types of information, such as user settings, the user line-of-sight information, and the speaker layout information, are input into the reproduction devices 1 and 2 by the input device 908.

The output device 909 includes, for example, a display device, such as a cathode ray tube (CRT) display device, a liquid crystal display (LCD) device, an organic light emitting diode (OLED) device, and a lamp. Further, the output device 909 includes an audio output device such as a speaker and a headphone. The display device displays various data as texts or images, and the voice output device converts the various data into audio, and outputs the audio. The output device 909 achieves a reproduction function of video and/or audio by the reproduction devices 1 and 2.

The storage device 910 is a device for storing data. The storage device 910 may include a storage medium, a recording device that records data in the storage medium, a reading device that reads data from the storage medium, a deleting device that deletes the data that has been recorded in the storage medium, and the like. The storage device 910 includes, for example, a hard disk drive (HDD). The storage device 910 drives a hard disk, and stores programs and various data performed by the CPU 901. The storage device 910 carries out functions of the input data storage sections 12, the intermediate data storage sections 14, and the output data storage sections 16 of the reproduction devices 1 and 2.

The drive 911 is a reader and writer for a storage medium, and is built in or externally attached to the information processing device 900. The drive 911 reads the information that is recorded in the removable storage medium 913 such as a magnetic disk, an optical disk, a magneto-optical disk, or a semiconductor memory, which is attached, and outputs the information to the RAM 903. In addition, the drive 911 is also capable of writing information into the removable storage medium 913.

The communication device 912 is, for example, a communication interface including a communication device or the like for connecting with the communication network 914. The communication device 912 carries out the respective functions of the acquisition sections 11 of the reproduction devices 1 and 2.

5. Conclusion

As described heretofore, according to each of the above-described embodiments, in a case where video and audio signals including a plurality of objects are reproduced and a changing process (rendering) of a localization on which the user line-of-sight information is reflected is performed, a reproduction system capable of suppressing a deviation in the image-audio synchronization is achieved.

Further, according to the above-described embodiments, in a case where video and audio including a plurality of objects are reproduced, for example, in a full dome type VR, the following capability of following the line-of-sight direction of the user can be improved without increasing a demand for the real-time performance in the process.

Further, in the reproduction of the video and audio signals including a plurality of objects, in a case of performing the changing process (rendering) of the localization on which the user line-of-sight information is reflected, the distribution of the process loads in the changing process of the localization is enabled.

Although the embodiments of the present disclosure have been described heretofore, the technical scope of the present disclosure is not limited to the above-described embodiments without change, and various changes can be made without departing from the gist of the present disclosure. In addition, component elements in different embodiments and modifications may be combined as appropriate.

Further, the effects in each of the embodiments described in the present specification are merely examples, and are not limited, and other effects may be obtained.

It is to be noted that the present technology can also have the following configurations.

(1)

An information processing device including:
- an acquisition section configured to acquire content data including a plurality of objects;
- an execution timing decision section configured to decide an execution timing of rendering each of the objects;
- a rendering section configured to render each of the objects on the basis of line-of-sight information of a user that has been input immediately before the execution timing of rendering each of the objects; and
- an output synthesis section configured to synthesize output data for every object that has been generated by the rendering.

(2)

The information processing device described in the above (1),
- in which the content data includes a plurality of pieces of metadata associated with each of the objects, and
- the execution timing decision section decides the execution timing of rendering each of the objects on the basis of the metadata.

(3)

The information processing device described in the above (2),
- in which the metadata includes location information of each object with a viewing/listening location of the user in a three-dimensional space reproduced by the content data used as a reference.

(4)

The information processing device described in the above (3),
- in which the execution timing decision section decides the execution timing of rendering each of the objects on the basis of a distance from the viewing/listening location of the user to each of the objects in the three-dimensional space.

(5)

The information processing device described in the above (4),
- in which a display time to be displayed in each reproduction environment is set for each of the objects, and
- with regard to the objects of same display times, the execution timing decision section decides the execution timing of rendering an object having a short distance to the viewing/listening location of the user in the three-dimensional space to be a later timing than the execution timing of rendering an object having a long distance to the viewing/listening location of the user in the three-dimensional space.

(6)
The information processing device described in the above (5),
in which the output synthesis section synthesizes the output data for every object on the basis of the display time of each of the objects.

(7)
The information processing device described in one of the above (2) to (6),
in which the rendering section renders each of the objects further on the basis of the metadata.

(8)
The information processing device described in the above (7),
in which the rendering section processes the metadata on the basis of line-of-sight information of the user, and renders each of the objects on the basis of the metadata that has been processed.

(9)
The information processing device described in one of the above (2) to (8),
in which the rendering section renders each of the objects further on the basis of information regarding a reproduction environment of the objects.

(10)
The information processing device described in one of the above (1) to (9), in which the plurality of objects includes an audio object.

(11)
The information processing device described in the above (10), in which the audio object is encoded by an MPEG-H 3D Audio encoding method.

(12)
The information processing device described in one of the above (1) to (11), in which the plurality of objects includes a video object.

(13)
The information processing device described in one of the above (1) to (12), in which the content data is a video content including an audio content.

(14)
An information processing method including:
acquiring content data including a plurality of objects;
deciding an execution timing of rendering each of the objects;
rendering each of the objects on the basis of line-of-sight information of a user that has been input immediately before the execution timing of rendering each of the objects; and
synthesizing output data for every object that has been generated by the rendering.

REFERENCE SIGNS LIST 1, 2 Reproduction device
11 Acquisition section
12 Input data storage section
13, 23 Decoding section
14 Intermediate data storage section
15, 25 Rendering section
16 Output data storage section
131, 231 Analyzer
132 Audio object decoder
133 Metadata decoder
134, 234 Rendering order decision device
151 Metadata processing device
152 Output gain calculator
153 Audio data generator
154, 254 Output synthesizer
232 Three-dimensional model data decoder
233 Scene data decoder
251 Scene data processing device
252 Output scale calculator
253 Video data generator
101 Audio decoding process and effect process
102 Output buffer
103A, 103B Panning process
104-1 Primary rendering
104-2 Secondary rendering
104-3 Tertiary rendering
105-1 Audio object A
105-2 Audio object B
105-3 Audio object C
106-1 to 106-3 Mapping
SP, SP1 to SP5 Speaker

The invention claimed is:

1. An information processing device, comprising:
an acquisition section configured to acquire content data including a plurality of objects;
an execution timing decision section configured to determine, based on a distance from one of a viewing or listening location of a user to each object of the plurality objects in a three-dimensional space, an execution timing of rendering of each object of the plurality of objects;
a rendering processing section configured to:
receive line-of-sight information of the user at a time immediately before the execution timing of rendering of each object of the plurality of objects, and
render each object of the plurality of objects based on the line-of-sight information of the user; and
an output synthesis section configured to synthesize output data for each object of the plurality of objects based on each object of the plurality of rendered objects.

2. The information processing device according to claim 1, wherein
the content data includes a plurality of pieces of metadata associated with each object of the plurality of objects, and
the execution timing decision section is further configured to determine the execution timing of rendering each object of the plurality of objects based on the metadata.

3. The information processing device according to claim 2, wherein the metadata includes location information of each object of the plurality of objects with one of the viewing or listening location of the user in the three-dimensional space as a reference.

4. The information processing device according to claim 1, wherein
a display time for each object of the plurality of objects is set to display each object of the plurality of objects in a reproduction environment, and
the execution timing decision section is further configured to determine, for each object of the plurality of objects that has a same display time, the execution timing of rendering a first object of the plurality of objects that has a short distance to one of the viewing or listening location of the user to be a later timing than the execution timing of rendering a second object that has long distance to one of the viewing or listening location of the user.

5. The information processing device according to claim 4, wherein the output synthesis section is further configured to synthesize the output data for each object of the plurality of objects based on the display time of each object of the plurality of objects.

6. The information processing device according to claim 2, wherein the rendering processing section is further configured to render each object of the plurality of object based on the metadata.

7. The information processing device according to claim 6, wherein the rendering processing section is further configured to:
process the metadata based on the line-of-sight information of the user, and
render each object of the plurality of object based on the processed metadata.

8. The information processing device according to claim 2, wherein the rendering processing section is further configured render each object of the plurality of objects based on information regarding a reproduction environment of the plurality of objects.

9. The information processing device according to claim 1, wherein the plurality of objects includes an audio object.

10. The information processing device according to claim 9, wherein the audio object is encoded by an MPEG-H 3D Audio encoding method.

11. The information processing device according to claim 1, wherein the plurality of objects includes a video object.

12. The information processing device according to claim 1, wherein the content data is a video content including an audio content.

13. An information processing method, comprising:
in an information processing device:
acquiring, by an acquisition section of the information processing device, content data including a plurality of objects;
determining, by an execution timing decision section of the information processing device, based on a distance from one of a viewing or listening location of a user to each object of the plurality objects in a three-dimensional space, an execution timing of rendering of each object of the plurality of objects;
receiving, by a rendering processing section of the information processing device, line-of-sight information of the user at a time immediately before the execution timing of rendering of each object of the plurality of objects,
rendering, by the rendering processing section of the information processing device, each object of the plurality of objects based on the line-of-sight information of the user; and
synthesizing, by an output synthesis section of the information processing device, output data for each object of the plurality of objects based on each object of the plurality of rendered objects.

* * * * *